(12) United States Patent
Hopkins et al.

(10) Patent No.: US 8,849,463 B2
(45) Date of Patent: Sep. 30, 2014

(54) FAN ARRAY CONTROL SYSTEM

(75) Inventors: Lawrence G. Hopkins, Happy Valley, OR (US); Brian James Motland, Sherwood, OR (US); Matthew Alan Gassaway, Portland, OR (US)

(73) Assignee: Huntair, Inc., Tualatin, OR (US)

(*) Notice: Subject to any disclaimer, the term of this patent is extended or adjusted under 35 U.S.C. 154(b) by 1009 days.

(21) Appl. No.: 12/889,211

(22) Filed: Sep. 23, 2010

(65) Prior Publication Data

US 2011/0014061 A1 Jan. 20, 2011

Related U.S. Application Data

(60) Provisional application No. 61/255,364, filed on Oct. 27, 2009.

(51) Int. Cl.
*G05B 13/00* (2006.01)
*F04D 15/00* (2006.01)

(52) U.S. Cl.
USPC ............................................ 700/276; 700/299

(58) Field of Classification Search
None
See application file for complete search history.

(56) References Cited

U.S. PATENT DOCUMENTS

| 2003/0015983 A1* | 1/2003 | Montero et al. ............. 318/473 |
| 2005/0005621 A1* | 1/2005 | Jayadev ........................ 62/230 |
| 2010/0291850 A1* | 11/2010 | Sabbaghian et al. ............ 454/61 |

\* cited by examiner

*Primary Examiner* — Sean Shechtman
*Assistant Examiner* — Steven Garland
(74) *Attorney, Agent, or Firm* — The Small Patent Law Group; Dean D. Small

(57) ABSTRACT

A fan array fan section in an air-handling system includes a plurality of fan units arranged in a fan array and positioned within an air-handling compartment. One preferred embodiment may include an array controller programmed to operate the plurality of fan units at peak efficiency by computing the power consumed in various configurations and selecting the configuration requiring minimum power to operate.

58 Claims, 25 Drawing Sheets

| 200 | 200 | 200 | 200 | 200 | 200 |
|---|---|---|---|---|---|
| 200 | 200 | 200 | 200 | 200 | 200 |
| 200 | 200 | 200 | 200 | 200 | 200 |
| 200 | 200 | 200 | 200 | 200 | 200 |

| 200 | 200 | 200 | 200 | 200 |
|---|---|---|---|---|
| 200 | 200 | 200 | 200 | 200 |
| 200 | 200 | 200 | 200 | 200 |
| 200 | 200 | 200 | 200 | 200 |
| 200 | 200 | 200 | 200 | 200 |

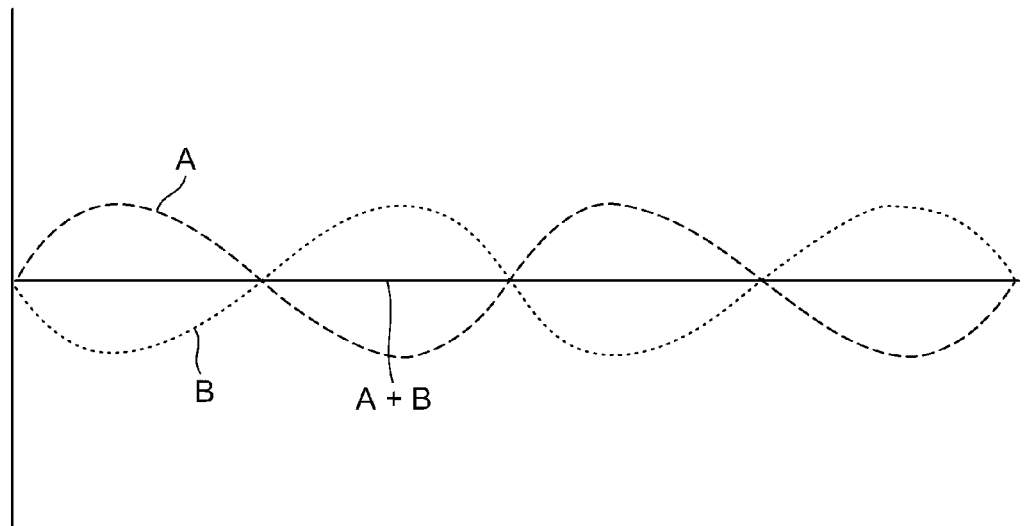
FIG. 30
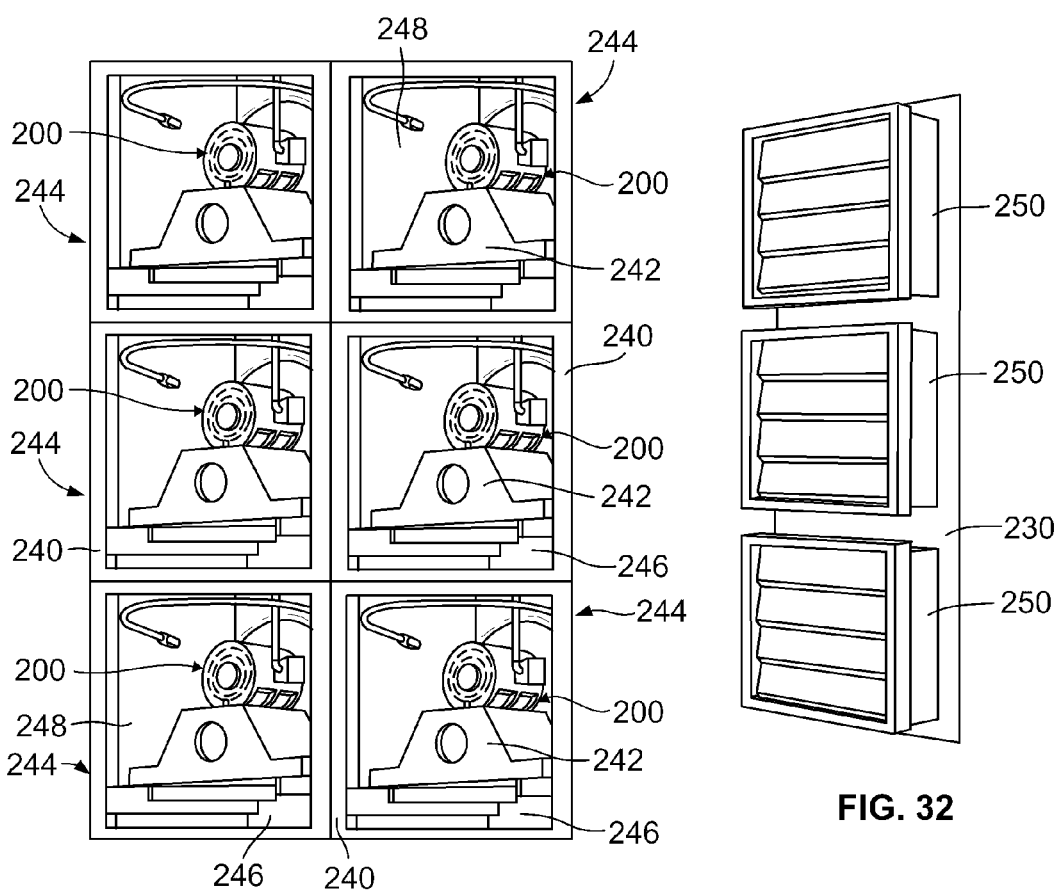
FIG. 31
FIG. 32

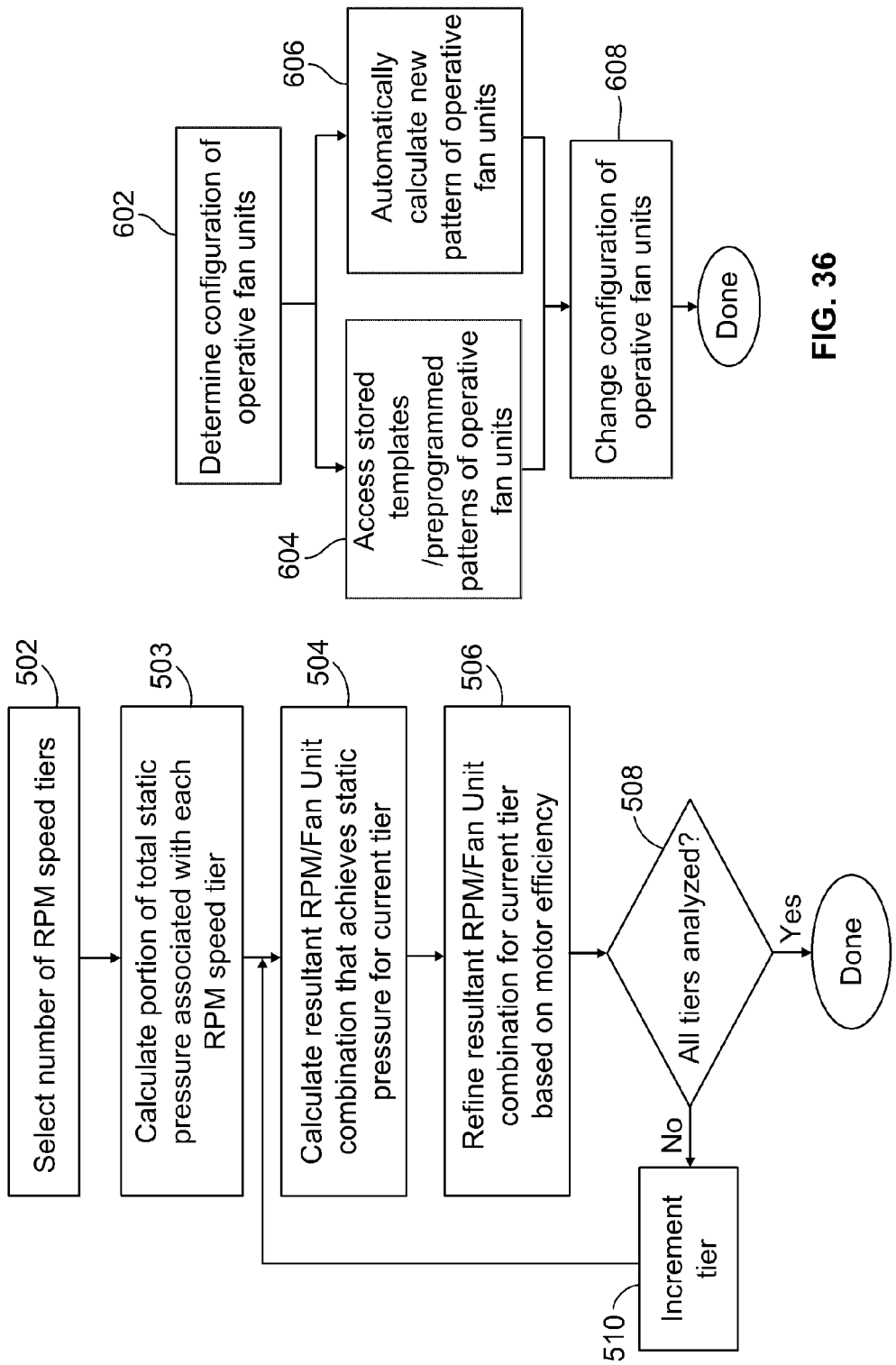

FAN ARRAY CONTROL SYSTEM

CROSS-REFERENCE TO RELATED APPLICATIONS

This application claims priority to U.S. Provisional Patent Application 61/255,364 filed Oct. 27, 2009, which is hereby incorporated by reference in its entirety.

BACKGROUND OF THE INVENTION

The present invention is directed to a fan array fan section utilized in an air-handling system.

Air-handling systems (also referred to as an air handler) have traditionally been used to condition buildings or rooms (hereinafter referred to as "structures"). An air-handling system is defined as a structure that includes components designed to work-together in order to condition air as part of the primary system for ventilation of structures. The air-handling system may contain components such as cooling coils, heating coils, filters, humidifiers, fans, sound attenuators, controls, and other devices functioning to meet the needs of the structures. The air-handling system may be manufactured in a factory and brought to the structure to be installed or it may be built on site using the necessary devices to meet the functioning needs of the structure. The air-handling compartment 102 of the air-handling system includes the inlet plenum 112 prior to the fan inlet cone 104 and the discharge plenum 110. Within the-air-handling compartment 102 is situated the fan unit 100 (shown in FIGS. 1 and 2 as an inlet cone 104, a fan 106, and a motor 108), fan frame, and any appurtenance associated with the function of the fan (e.g. dampers, controls, settling means, and associated cabinetry). Within the fan 106 is a fan wheel (not shown) having at least one blade. The fan wheel has a fan wheel diameter that is measured from one side of the outer periphery of the fan wheel to the opposite side of the outer periphery of the fan wheel. The dimensions of the handling compartment 102 such as height, width, and airway length are determined by consulting fan manufacturers data for the type of fan selected.

FIG. 1 shows an exemplary prior art air-handling system having a single fan unit 100 housed in an air-handling compartment 102. For exemplary purposes, the fan unit 100 is shown having, an inlet cone 104, a fan 106, and a motor 108. Larger structures, structures requiring greater air volume, or structures requiring higher or lower temperatures have generally needed a larger fan unit 100 and a generally correspondingly larger air-handling compartment 102.

As shown in FIG. 1, an air-handling compartment 102 is substantially divided into a discharge plenum 110 and an inlet plenum 112. The combined discharge plenum 110 and the inlet plenum 112 can be referred to as the airway path 120. The fan unit 100 may be situated in the discharge plenum 110 as shown), the inlet plenum 112, or partially within the inlet plenum 112 and partially within the discharge plenum 110. The portion of the airway path 120 in which the fan unit 100 is positioned may be generically referred to as the "fan section" (indicated by reference numeral 114). The size of the inlet cone 104, the size of the fan 106, the size the motor 108, and the size of the fan frame (not shown) at least partially determine the length of the airway path 120. Filter banks 122 and/or cooling coils (not shown) may be-added to the system either upstream or downstream of the fan units 100.

For example, a first exemplary structure requiring 50,000 cubic feet per minute of air flow at six (6) inches water gage pressure would generally require a prior art air-handling compartment 102 large enough to house a 55 inch impeller, a 100 horsepower motor, and supporting framework. The prior art air-handling compartment 102, in turn would be approximately 92 inches high by 114 to 147 inches wide and 106 to 112 inches long. The minimum length of the air-handling compartment 102 and/or airway path 120 would be dictated by published manufacturers data for a given fan type, motor size, and application. Prior art cabinet sizing guides show exemplary rules for configuring an air-handling compartment 102. These rules are based on optimization, regulations, and experimentation.

For example, a second exemplary structure includes a recirculation air handler used in semiconductor and pharmaceutical clean rooms requiring 26,000 cubic feet per minute at two (2) inches-water gage pressure. This structure would generally require a prior art air-handling system with a air-handling compartment 102 large enough to house a 44 inch impeller, a 25 horsepower motor, and supporting framework. The prior art air-handling compartment 102, in turn would be approximately 78 inches high by 99 inches wide and 94 to 100 inches long. The minimum length of the air-handling compartment 102 and/or airway path 120 would be dictated by published manufacturers data for a given fan type, motor size and application. Prior art cabinet sizing guides show exemplary rules for configuring an air-handling compartment 102. These rules are based on optimization, regulations, and experimentation.

These prior art air-handling systems have many problems including the following exemplary problems:

Because real estate (e.g. structure space) is extremely expensive, the larger size of the air-handling compartment 102 is extremely undesirable.

The single fan units 100 are expensive to produce and are generally custom produced for each job.

Single fan units 100 are expensive to operate.

Single fan units 100 are inefficient in that they only have optimal or peak efficiency over a small portion of their operating range.

If a single fan unit 100 breaks down, there is no air conditioning at all.

The low frequency sound of the large fan unit 100 is hard to attenuate.

The high mass and turbulence of the large fan unit 100 can cause undesirable vibration.

Height restrictions have necessitated the use of air-handling systems built with two fan units 100 arranged horizontally adjacent to each other. It should be noted, however, that a good engineering practice is to design air handler cabinets and discharge plenums 110 to be symmetrical to facilitate more uniform air flow across the width and height of the cabinet. Twin fan units 100 have been utilized where there is a height restriction and the unit is designed with a high aspect ratio to accommodate the desired flow rate. As shown in the Greenheck "Installation Operating and Maintenance Manual," if side-by-side installation was contemplated, there were specific instructions to arrange the fans such that there was at least one fan wheel diameter spacing between the fan wheels and at least one-half a fan wheel diameter between the fan and the walls or ceilings. The Greenheck reference even specifically states that arrangements "with less spacing will experience performance losses." Normally, the air-handling system and air-handling compartment 102 are designed for a uniform velocity gradient of 500 feet per minute velocity in the direction of air flow. The two fan unit 100 air-handling systems, however, still substantially suffered from the problems of the single unit embodiments. There was no recognition of advantages by increasing the number of fan units 100 from one to two. Further, the two fan unit 100 section exhibits a non-uniform velocity gradient in the region following the fan unit 100 that creates uneven air flow across filters, coils, and sound attenuators.

It should be noted that electrical devices have taken advantage of multiple fan cooling systems. For example, U.S. Pat. No. 6,414,845 to Bonet uses a multiple-fan modular cooling component for installation in multiple component-bay electronic devices. Although some of the advantages realized, in the Bonet system would be realized in the present system, there are significant differences. For example, the Bonet system is designed to facilitate electronic component cooling by directing the output from each fan to a specific device or area. The Bonet system would not work to direct air flow to all devices in the direction of general air flow. Other patents such as U.S. Pat. No. 4,767,262 to Simon and U.S. Pat. No. 6,388,880 to El-Ghobashy et al. teach fan arrays for use with electronics.

Even in the computer and machine industries, however, operating fans in parallel is taught against as not providing the desired results except in low system resistance situations where fans operate in near free delivery. For example, Sunon Group has a web page in which they show two axial fans operating in parallel, but specifically state that if "the parallel fans are applied to the higher system resistance that enclosure has, . . . less increase in flow results with parallel fan operation." Similar examples of teaching against using fans in parallel are found in an article accessible from HighBeam Research's library (stati.highbearm.com) and an article by Ian McLeod accessible at (papstplc.com).

BRIEF DESCRIPTION OF THE INVENTION

The present invention is directed to a fan array fan, section in an air-handling system that includes a plurality of fan units arranged in a fan array and positioned within an air-handling, compartment. One preferred embodiment may include an array controller programmed to operate the plurality of fan units at peak efficiency. The plurality of fan units may be arranged in a true array configuration, a spaced pattern array configuration, a checker board array configuration, rows slightly offset array configuration, columns slightly offset array configuration, or a staggered array configuration.

The foregoing and other objectives, features, and advantages of the invention will be more readily understood upon consideration of the following detailed description of the invention, taken in conjunction with the accompanying drawings.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 4 is a plan or elevation view of a 4×6 exemplary fan array fan section in an air-handling system of the present invention having a plurality of small fan units within an air-handling compartment.

FIG. 5 is a plan or elevation view of a 5×5 exemplary fan array fan section in an air-handling system of the present invention having a plurality of small fan units within an air-handling compartment.

FIG. 30 graphically shows a principle of an embodiment in that, as the sound waves A and B interact, there is a degree of wave cancellation.

FIG. 31 shows an embodiment using either a grid system or modular units using separate structure (not shown) for interlocking the fan units.

FIG. 32 shows an array of dampeners that may be positioned either in front of or behind the fan units to at least partially prevent back drafts.

FIG. 35 illustrates an algorithm for operating a fan array in accordance with an embodiment.

FIG. 36 illustrates an algorithm for operating a fan array in accordance with an embodiment.

DETAILED DESCRIPTION OF THE INVENTION

Figures 11, 12:
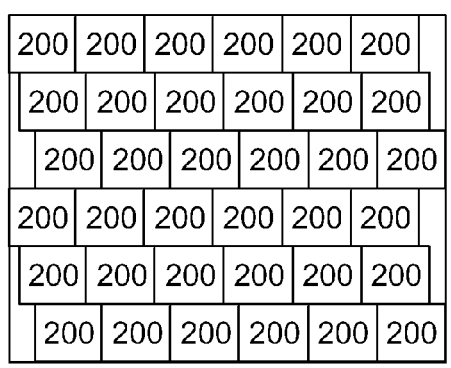
FIG. 11 is a plan or elevation view of an alternative exemplary fan array fan section in an air-handling system of the present invention in which a plurality of small fan units are arranged in rows slightly offset array within an air-handling compartment.
FIG. 12 is a plan or elevation view of an alternative exemplary fan array fan section in an air-handling system of the present invention in which a plurality of small fan units are arranged in columns slightly offset array within an air-handling compartment.

The present invention is directed to a fan array fan section in an air-handling system. As shown in FIGS. 3-12, the fan array fan section in the air-handling system uses a plurality of individual single fan units 200. In one preferred embodiment, the fan units 200 are arranged in a true array (FIGS. 4-8), but alternative embodiments may include, for example, alternative arrangements such as in a spaced pattern (FIG. 9), a checker board (FIG. 10), rows slightly offset (FIG. 11), or columns slightly offset (FIG. 12). As the present invention could be implemented with true arrays and/or alternative arrays, the term "array" is meant to be comprehensive.

The fan units 200 in the fan array of the present invention may be spaced as little as 20% of a fan wheel diameter. Optimum operating conditions for a closely arranged array may be found, at distances as low as 30% to 60% of a fan wheel diameter. By closely spacing the fan units 200, more air may be moved in a smaller space. For example, if the fan wheels of the fan units 200 have a 20 inch fan wheel diameter, only a 4 inch space (20%) is needed between the outer periphery of one fan wheel and the outer periphery of the adjacent fan wheel (or a 2 inch space between the outer periphery of a fan wheel and an the adjacent wall or ceiling).

By using smaller fan units 200 it is possible to support the fan units 200 with less intrusive structure (fan frame). This can be compared to the large fan frame that supports prior art fan units 100 and functions as a base. This large fan frame must be large and sturdy enough to support the entire weight of the prior art fan units 100. Because of their size and position, the known fan frames cause interference with air flow. In the preferred embodiment, therefore, the fan units 200 of the fan array may be supported by a frame that supports the motors 108 with a minimum restriction to air flow.

As mentioned in the Background, others have tried using side-by-side installation of two fan units 100 arranged horizontally adjacent to each other within an air-handling system. As is also mentioned in the Background, fan arrays have been used in electronic and computer assemblies. However, in the air-handling system industry, it has always been held that there must be significant spacing between the horizontally arranged fan wheels and that arrangements with less spacing will experience performance losses. A single large fan moves all the air in a cabinet. Using two of the same or slightly smaller fans caused the air produced by one fan to interfere with the air produced by the other fan. To alleviate the interference problem, the fans had to be spaced within certain guidelines—generally providing a clear space between the fans of a distance of at least one wheel diameter (and a half a wheel diameter to an adjacent wall). Applying this logic, it would not have made sense to add more fans. And even if additional fans had been added, the spacing would have continued to be at least one wheel diameter between fans. Further, in the air-handling system industry, vertically stacking fan units would have been unthinkable because the means for securing the fan units would not have been conducive to such stacking (they are designed to be positioned on the floor only).

It should be noted that the plenum fan is the preferred fan unit 200 of the present invention. In particular, the APF-121, APF-141, APF-161, and APF-181 plenum fans (particularly the fan wheel and the fan cone) produced by Twin City Fan Companies, Ltd. of Minneapolis, Minn., U.S. has been found to work well. The reason that plenum fans work best is that they do not produce points of high velocity such as those produced by axial fans and housed centrifugal fans and large plenum fans. Alternative embodiments use known fan units or fan units yet to be developed that will not produce high velocity gradients in the direction of air flow. Still other embodiments, albeit less efficient, use fan units such as axial fans and/or centrifugal housed fans that have points of high velocity in the direction of air flow.

Figure 13:
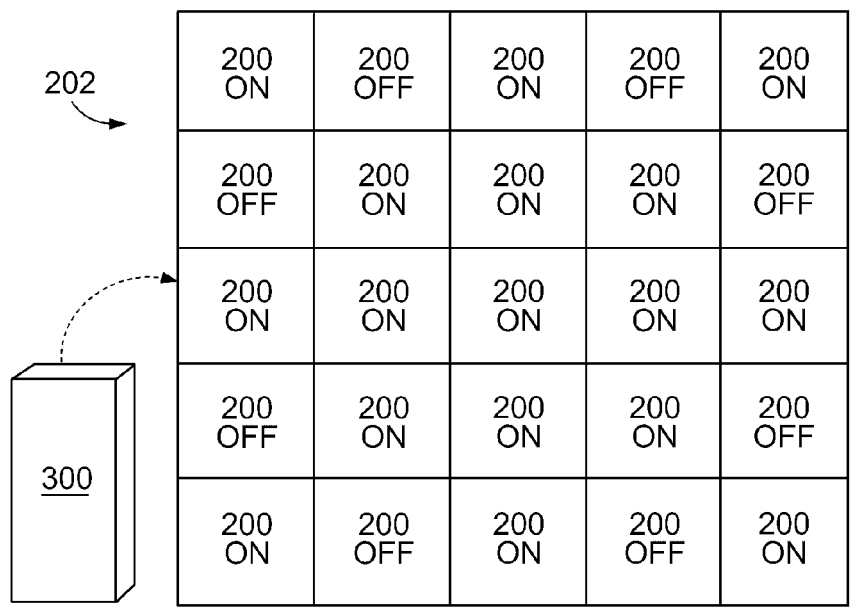
FIG. 13 is a plan or elevation view of a 5×5 exemplary fan array fan section in an air-handling system of the present invention running at 52% capacity by turning a portion of the fans on and a portion of the fans off.
Figure 14:
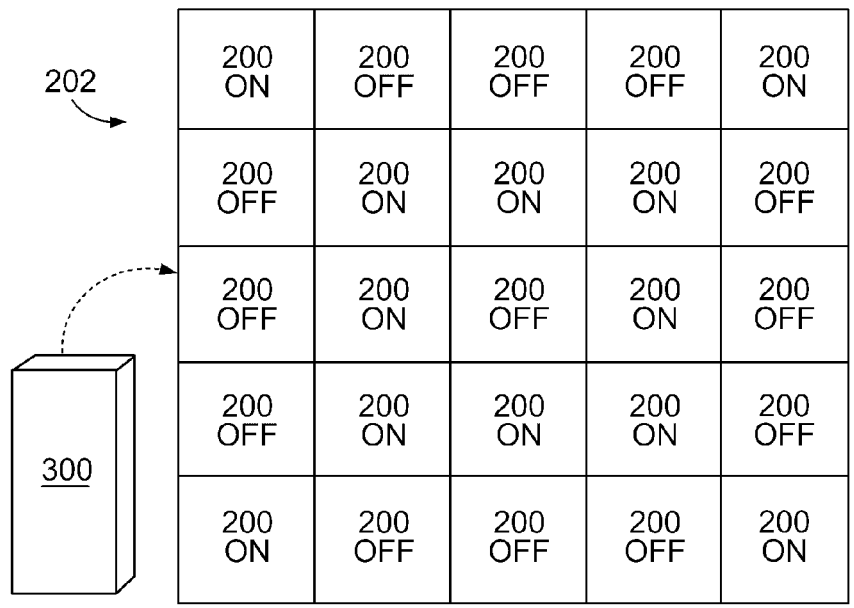
FIG. 14 is a-plan or elevation view of a 5×5 exemplary fan array fan section in an air-handling system of the present invention running at 32% capacity by turning a portion of the fans on and a portion of the fans off.

In the preferred embodiment, each of the tan units 200 in the fan array fan section in the air-handling system is controlled by an array controller 300 (FIGS. 13 and 14). In one preferred embodiment, the array controller 300 may be programmed to operate the fan units 200 at peak efficiency. In this peak efficiency embodiment, rather than running all of the fan units 200 at a reduced efficiency, the array controller 300 turns off certain fan units 200 and runs the remaining fan units 200 at peak efficiency. In an alternative embodiment, the fan units 200 could all run at the same power level (e.g. efficiency and/or flow rate) of operation.

Another advantage of the present invention is that the array controller 300 (which may be a variable frequency drive (VFD)) used for controlling fan speed and thus flow rate and pressure, could be sized for the actual brake horsepower of the fan array fan section in the air-handling system. Since efficiency of the fan wall array can be optimized over a wide range of flow rates and pressures, the actual operating power consumed by the fan array is substantially less than the actual operating power consumed by the comparable prior art air-handling systems and the array controller's power could be reduced accordingly. The array controller 300 could be sized to the actual power consumption of the fan array where as the controller (which may have been a variable frequency drive) in a traditional design would be sized to the maximum nameplate rating of the motor per Electrical Code requirements. An example of a prior art fan design supplying 50,000 cubic feet per minute of air at 2.5 inches pressure, would require a 50 horsepower motor and 50 horsepower controller. The new invention will preferably use an array of fourteen 2 horsepower motors and a 30 horsepower array controller 300.

This invention solves many of the problems of the prior art air-handling systems including, but not limited to real estate, reduced production costs, reduced operating expenses, increased efficiency, improved air flow uniformity, redundancy, sound attenuation advantages, and reduced vibration.

Controllability

As mentioned, preferably each of the fan units 200 in the fan array fan section in the air-handling system is controlled by an array controller 300 (FIGS. 13 and 14) that may be programmed to operate the fan units 200 at peak efficiency. In this peak efficiency embodiment, rather than running all of the fan units 200 at a reduced efficiency, the array controller 300 is able to turn off certain fan units 200 and run the remaining fan units 200 at peak efficiency. Preferably, the array controller 300 is able to control fan units 200 individually, in predetermined groupings, and/or as a group as a whole.

For example, in the 5×5 fan array such as that shown in FIGS. 5, 13, and 14, a person desiring to control the array may select desired air volume, a level of air flow, a pattern of air flow, and/or how many fan units 200 to operate. Turning first to air volume, each fan unit 200 in a 5×5 array contributes 4% of the total air. In variable air volume systems, which is what most structures have, only the number of fan units 200 required to meet the demand would operate. A control system (that may include the array controller 300) would be used to take fan units 200 on line (an "ON" fan unit 200) and off line (an "OFF" fan unit 200) individually. This ability to turn fan units 200 on and off could effectively eliminate the need for a variable frequency drive. Similarly, each fan unit 200 in a 5×5 array uses 4% of the total power and produces 4% of the level of air flow, Using a control system to take fan units 200 on line and off line allows a user to control power usage and/or air flow. The pattern of air flow can also be controlled if that would be desirable. For example, depending on the system it is possible to create a pattern of air flow only around the edges of a cabinet or air only at the top. Finally, individual fan units 200 may be taken on line and off line. This controllability may be advantageous if one or more fan units 200 are not working properly, need to be maintained (e.g. needs general service), and/or need to be replaced. The problematic individual fan units 200 may be taken offline while the remainder of the system remains fully functional. Once the individual fan units 200 are ready for use, they may be brought back on line.

A further advantage to taking fan units 200 on and off line occurs when building or structure control systems require low volumes of air at relatively high pressures. In this case, the fan units 200 could be modulated to produce a stable operating point and eliminate the surge effects that sometimes plague structure owners and maintenance staff. The surge effect is where the system pressure is too high for the fan speed at a given volume and the fan unit 200 has a tendency to go into stall.

Examples of controllability are shown in FIGS. 13 and 14. In the fan array fan section in the air-handling system shown in FIG. 13, the array controller 300 alternates "ON" fan units 200 and "OFF" fan units 200 in a first exemplary pattern as shown so that the entire system is set to operate at 52% of the maximum rated air flow but only consumes 32% of full rated power. These numbers are based on exemplary typical fan operations in a structure. FIG. 14 shows the fan array fan section in the air-handling system set to operate at 32% of the maximum rated air flow but only consumes 17% of full rated power. These numbers are based on exemplary typical fan operations in a structure. In this embodiment, the array controller 300 creates a second exemplary pattern of "OFF" fan units 200 and "ON" fan units 200 as shown.

Real Estate

Figure 1A:
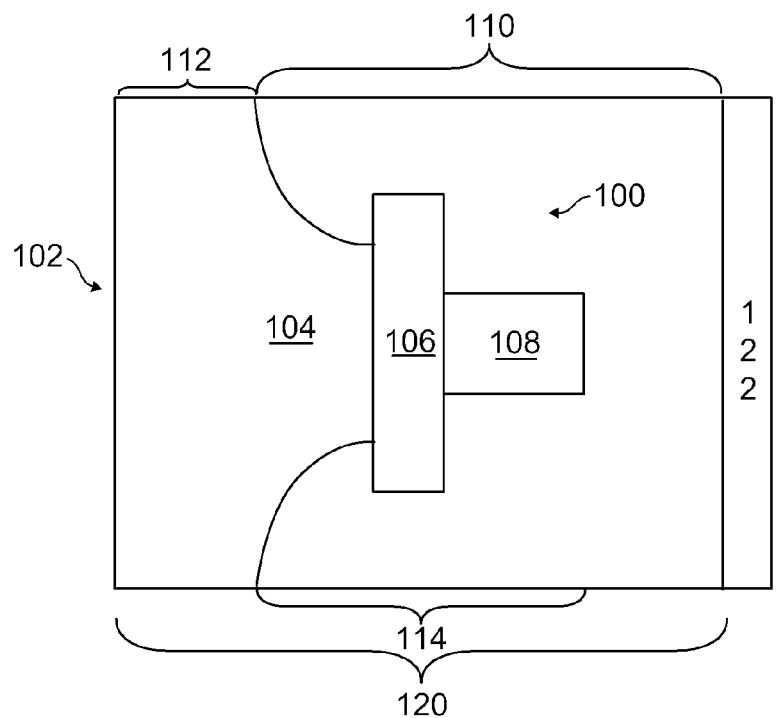
FIG. 1A is a side view of an exemplary prior art air-handling system having a single large fan unit within an air-handling compartment.
Figure 1B:
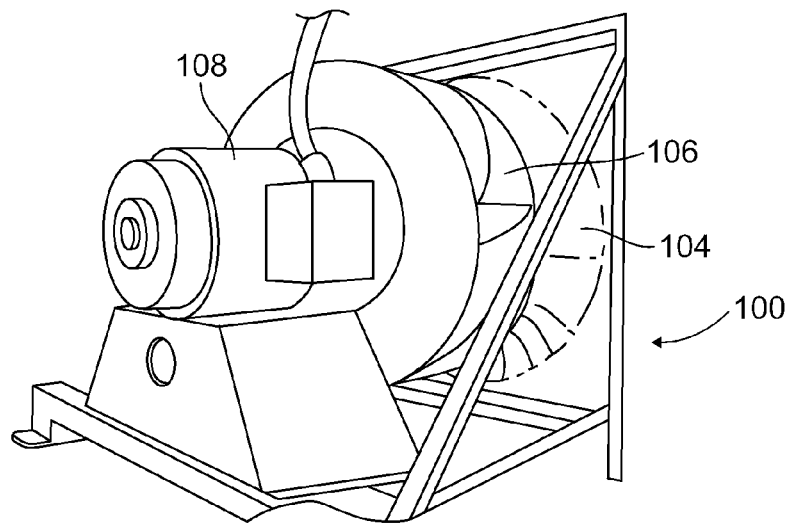
FIG. 1B is a perspective view of an exemplary prior art large fan unit.
Figure 2A:
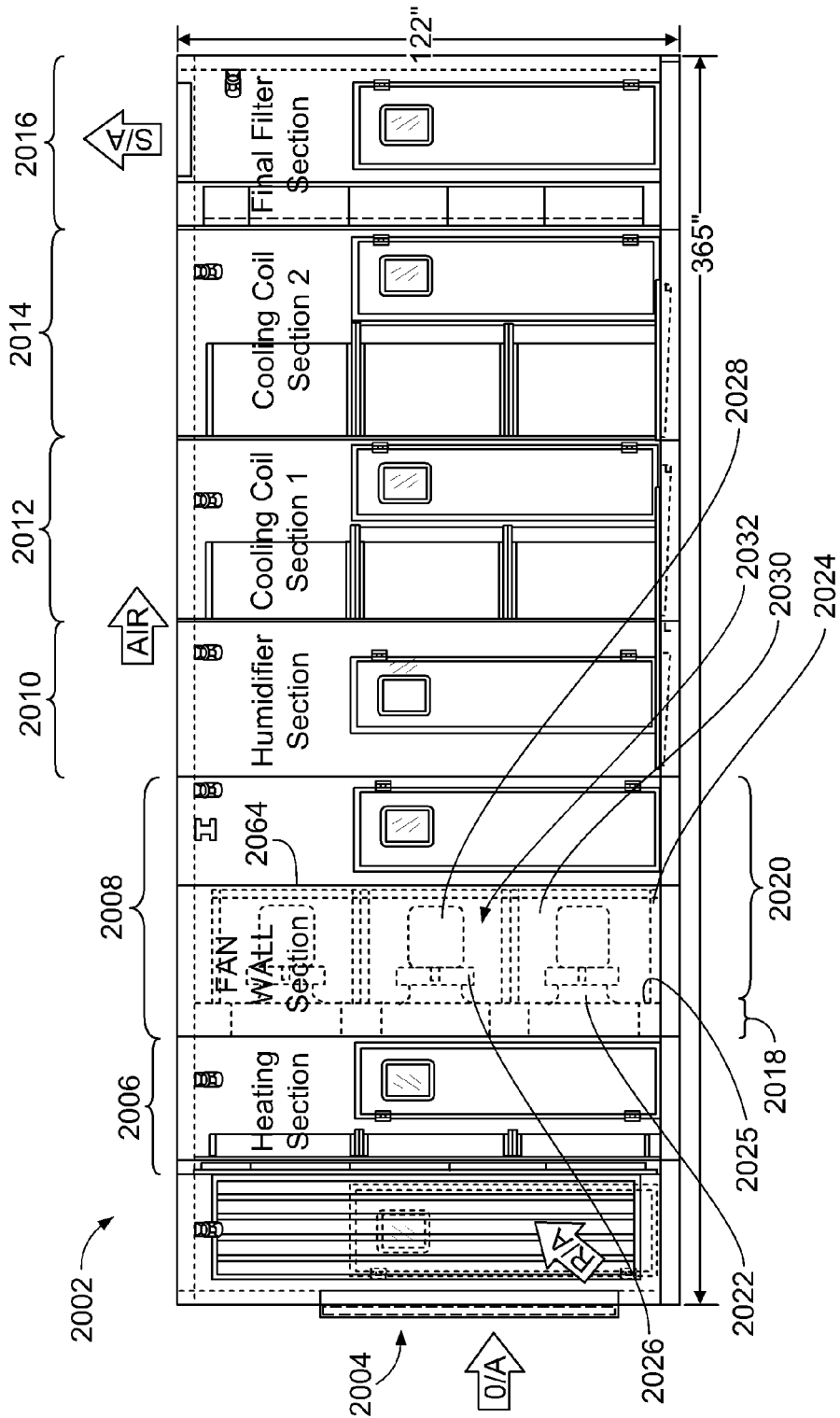
FIG. 2A is a side view of an air handling system of the prior art having a plurality of small fan units within an air-handling compartment.
Figure 2B:
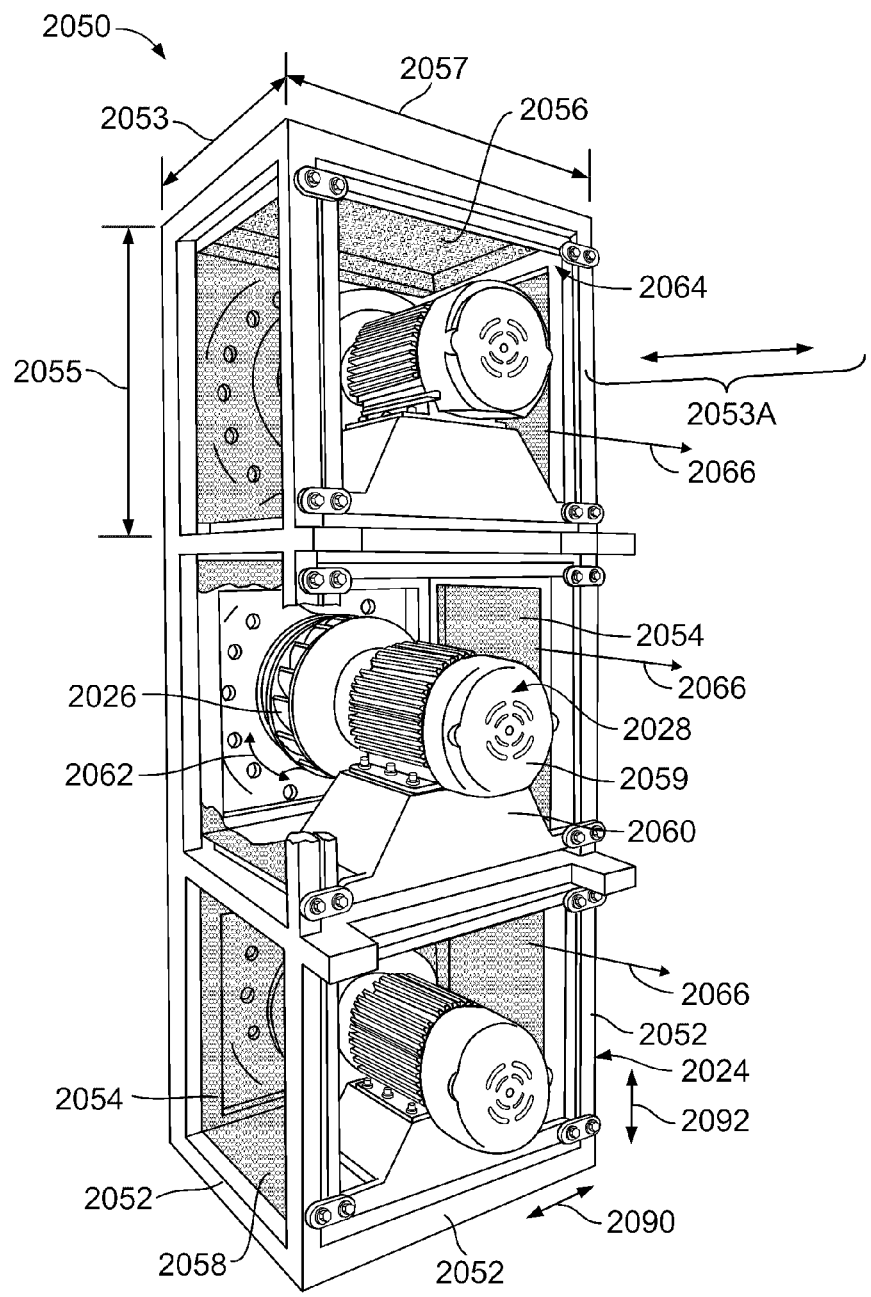
FIG. 2B is a perspective view of a prior art fan array fan section.
Figure 3:
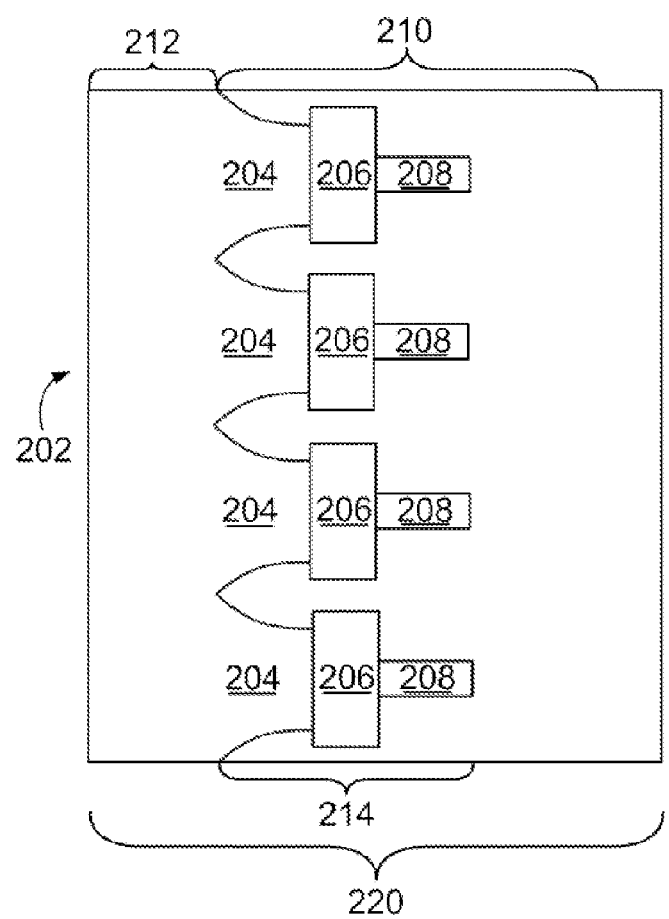
FIG. 3 is a side view of an exemplary fan array fan section in an air-handling system of the present invention having a plurality of small fan units within an air-handling compartment.

The fan array fan section in the air-handling section 220 of the present invention preferably uses (60% to 80%) less real estate than prior art discharge plenums 120 (with the hundred series number being prior art as shown in FIG. 1 and the two hundred series number being the present invention as shown in FIG. 3) in air-handling systems. Comparing the prior art (FIG. 1) and the present invention (FIG. 3) shows a graphical representation of this shortening of the airway path 120, 220. There are many reasons that using multiple smaller fan units 200 can reduce the length of the airway path 120, 220. For example, reducing the size of the fan unit 100, 200 and motor 108, 208 reduces the length of the discharge plenum 110, 210. Similarly, reducing the size of the inlet cone 104, 204 reduces the length of the inlet plenum 112, 212. The length of the discharge plenum 110, 210 can also be reduced because air from the fan array fan section in the air-handling system of the present invention is substantially uniform whereas the prior art air-handling system has points of higher air velocity and needs time and space to mix so that the flow is uniform by the time it exits the air-handling compartment 102, 202. (This can also be described as the higher static efficiency in that the present invention eliminates the need for settling means downstream from the discharge of a prior art fan system because there is little or no need to transition from high velocity to low velocity.) The fan array fan section in the air-handling system takes in air from the inlet plenum 212 more evenly and efficiently than the prior art air-handling system so that the length of the inlet plenum 112, 212 may be reduced.

For purposes of comparison, the first exemplary structure set forth in the Background of the Invention (a structure requiring 50,000 cubic feet per minute of air flow at a pressure of six (6) inches water gage) will be used. Using the first exemplary structure an exemplary embodiment of the present invention could be served by a nominal discharge plenum 210 of 89 inches high by 160 inches wide and 30 to 36 inches long (as compared to 106 to 112 inches long in the prior art embodiments). The discharge plenum 210 would include a 3×4 fan array fan section in the air-handling system such as the one shown in FIG. 6) having 12 fan units 200. The space required for each exemplary fan unit 200 would be a rectangular cube of approximately 24 to 30 inches on a side depending on the array configuration. The airway path 220 is 42 to 48 inches (as compared to 88 to 139 inches in the prior art embodiments).

For purposes of comparison, the second exemplary structure set forth in the Background of the Invention (a structure requiring 26,000 cubic feet per minute of air flow at a pressure of two (2) inches water gage) will be used. Using the second exemplary structure, an exemplary embodiment of the present invention could be served by a nominal discharge plenum 210 of 84 inches high by 84 inches wide, and 30 to 36 inches long (as compared to 94 to 100 inches long in the prior art embodiments). The discharge plenum would include a 3×3 fan array fan section in the air-handling system (such as the one shown in FIG. 7) having 9 fan units 200. The space required for each exemplary fan unit 200 would be a rectangular cube of approximately 24 to 30 inches on a side depending on the array configuration. The airway path 220 is 42 to 48 inches (as compared to 71 to 95 inches in the prior art embodiments).

Reduced Production Costs

It is generally more cost effective to build the fan array fan section in the air-handling system of the present invention as compared to the single fan unit 100 used in prior art air-handling systems. Part of this cost savings may be due to the fact that individual fan units 200 of the fan array can be mass-produced. Part of this cost savings may be due to the fact that it is less expensive to manufacture smaller fan units 200. Whereas the prior art single fan units 100 were generally custom built for the particular purpose, the present invention could be implemented on a single type of fan unit 200. In alternative embodiments, there might be several fan units 200 having different sizes and/or powers (both input and output). The different fan units 200 could be used in a single air-handling system or each air-handling system would have only one type of fan unit 200. Even when the smaller fan units 200 are custom made, the cost of producing multiple fan units 200 for a particular project is almost always less that the cost of producing a single large prior art fan unit 100 for the same project. This may be because of the difficulties of producing the larger components and/or the cost of obtaining the larger components necessary for the single large prior art fan unit 100. This cost savings also extends to the cost of producing a smaller air-handling compartment 202.

In one preferred embodiment of the invention, the fan units 200 are modular such that the system is "plug and play." Such modular units may be implemented by including structure for interlocking on the exterior of the fan units 200 themselves. Alternatively, such modular units may be implemented by using separate structure for interlocking the fan units 200. In still, another alternative embodiment, such modular units may be implemented by using a grid system into which the fan units 200 may be placed.

Reduced Operating Expenses

The fan array fan section in the air-handling system of the present invention preferably are less expensive to operate than prior art air-handling systems because of greater flexibility of control and fine tuning to the operating requirements of the structure. Also, by using smaller higher speed fan units 200 that require less low frequency noise control and less static resistance to flow.

Increased Efficiency

The fan array fan section in the air-handling system of the present invention preferably is more efficient than prior art air-handling systems because each small fan unit 200 can run at peak efficiency. The system could turn individual fan units 200 on and off to prevent inefficient use of particular fan units 200. It should be noted that an array controller 300 could be used to control the fan units 200. As set forth above, the array controller 300 turns off certain fan units 200 and runs the remaining fan units 200 at peak efficiency.

Redundancy

Multiple fan units 200 add to the redundancy of the system, if a single fan unit 200 breaks down, there will still be cooling. The array controller 300 may take disabled fan units 200 into consideration such that there is no noticeable depreciation in cooling or air flow rate. This feature may also be useful during maintenance as the array controller 300 may turn of fan units 200 that are to be maintained offline with no noticeable depreciation in cooling or air flow rate.

Sound Attenuation Advantages

The high frequency sound of the small fan units 200 is easier to attenuate than the low frequency sound of the large fan unit. Because the fan wall has less low frequency sound energy, shorter less costly sound traps are needed to attenuate the higher frequency sound produced by the plurality of small fan units 200 than the low frequency sound produced by the single large fan unit 100. The plurality of fan units 200 will each operate in a manner such that acoustic waves from each unit will interact to cancel sound at certain frequencies thus creating a quieter operating unit than prior art systems.

Reduced Vibration

The multiple fan units 200 of the present invention have smaller wheels with lower mass and create less force due to residual unbalance thus causing less vibration than the large fan unit. The overall vibration of multiple fan units 200 will transmit less energy to a structure since individual fans will tend to cancel each other due to slight differences in phase. Each fan unit 200 of the multiple fan units 200 manage a smaller percentage of the total air handling requirement and thus produce less turbulence in the air stream and substantially less vibration.

Alternative Embodiments

As mentioned, in one preferred embodiment of the invention, the fan units 200 are modular such that the system is "plug and play." Such modular units may be implemented by including structure for interlocking on the exterior of the fan units 200 themselves. Alternatively, such modular units may be implemented by using separate structure for interlocking the fan units 200. In still another alternative embodiment, such modular units may be implemented by using a grid system into which the fan units 200 may be placed.

Figure 16:
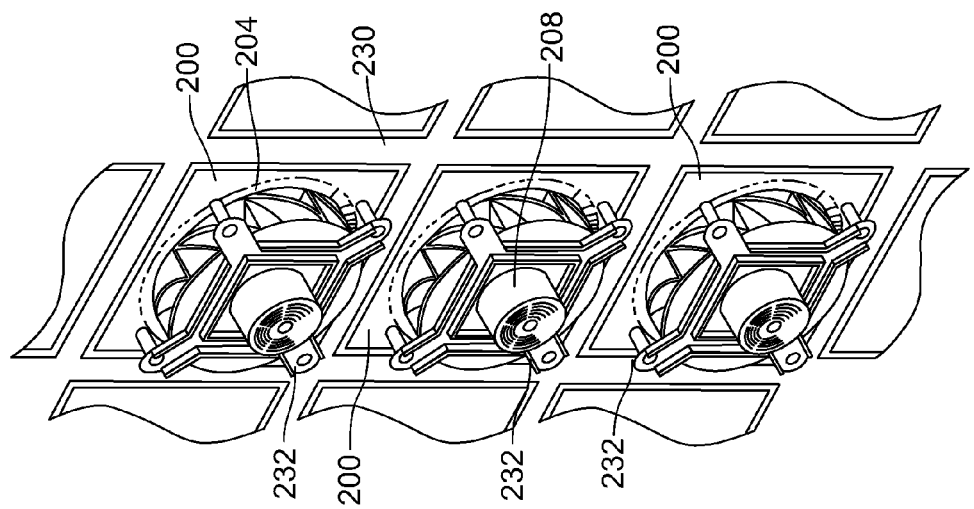
FIG. 16 is a perspective view of an exemplary fan array using a grid system into which fan units are mounted.

FIG. 16 shows an embodiment using an exemplary grid system 230 into which the fan units 200 may be placed. In this embodiment the grid may be positioned and/or built within the air-handling compartment 202. The fan units 200 may then be positioned into the grid openings, One advantage of this configuration is that individual fan units 200 may be easily removed, maintained, and/or replaced. This embodiment uses an exemplary unique motor mount 232 that supports the motor 208 without interfering with air flow therearound. As shown, this exemplary motor mount 232 has a plurality of arms that mount around the fan inlet cone 204. It should be noted that the dimensions of the grid are meant to be exemplary. The grid may be constructed taking into consideration that the fan units 200 in the present invention may be spaced with as little as 20% of a fan wheel diameter between the fan units 200.

FIG. 31 shows an embodiment using either a grid system or modular units 240 using separate structure (not shown) for interlocking the fan units 200. In this exemplary embodiment, each of the fan units 200 are mounted on a more traditional motor mount 242 within its own fan unit chamber 244. In one preferred embodiment, the fan unit 200 and motor mount 242 are preferably suspended within their own fan unit chamber 244 such that there is an air relief passage 246 therebelow. This air relieve passage 246 tends to improve air flow around the fan units 200.

The fan unit chambers 244 shown in FIG. 31 may include one or more interior surface made from or lined with an acoustically absorptive material or "insulation surface" 248. Going against conventional industry wisdom that surfaces cannot be placed in close proximity with the fan units 200, the present invention places one or more insulation surfaces 248 at least partially around each fan unit 200 without disrupting air flow. The insulation surfaces 248 may include one or more of the sides, top, bottom, front, or back. Exemplary types of insulation include, but are not limited to traditional insulation board (such as that made from inorganic glass fibers (fiberglass) alone or with a factory-applied foil-scrim-kraft (FSK) facing or a factory-applied all service jacket (ASJ)) or alternative insulation such as open cell foam such as that disclosed in U.S. patent application Ser. No. 10/606,435, which is assigned to the assignee of the present invention, and which the disclosure of which is hereby incorporated by reference herein. Together, the insulation surfaces 248 on the fan unit chambers 244 tend to function as a coplanar silencer. Some of the benefits of using the coplanar silencer include (1) no added airway length for splitters, (2) no pressure drop, and/or (3) relatively low cost. The acoustic advantages of this and other embodiments make the present invention ideal for use in concert halls, lecture halls, performing arts centers, libraries, hospitals, and other applications that are acoustically sensitive.

Figure 17:
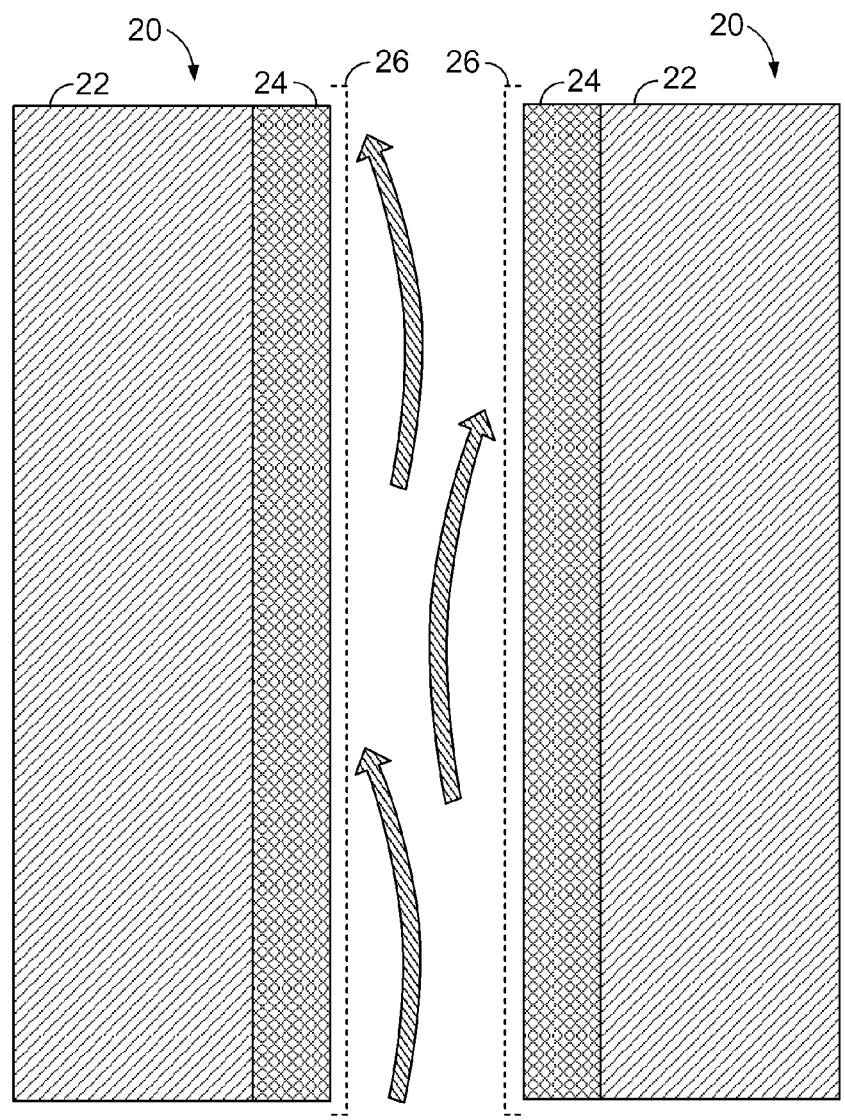
FIG. 17 shows airflow between the two panels which represent acoustically insulated surfaces and sound attenuation layers.
Figure 18:
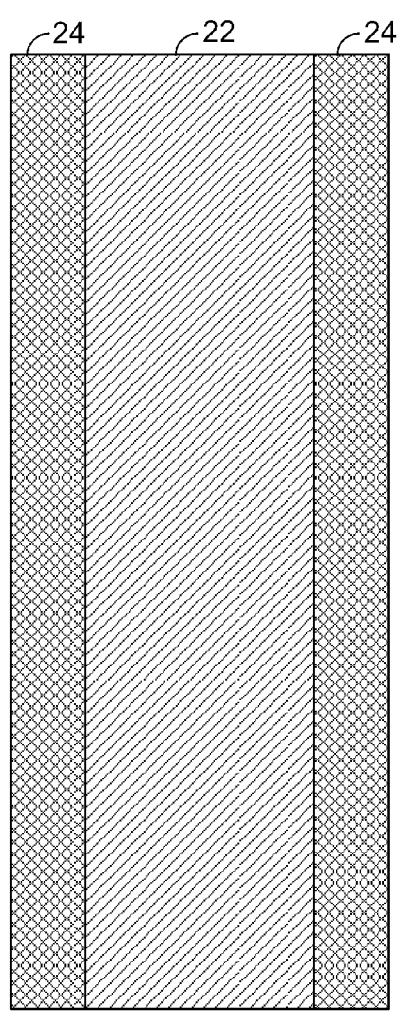
FIG. 18 shows an embodiment in which a fiberglass core has both sides layered with open cell foam.
Figure 20:
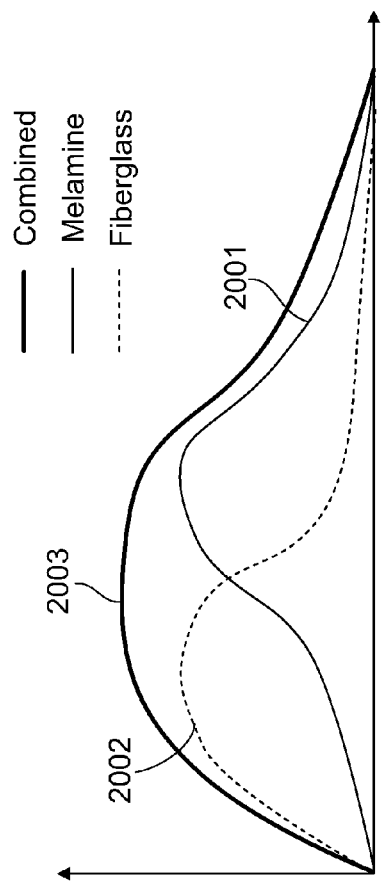
FIG. 20 shows an exemplary graph of two materials that provide different types of sound absorption over a range of frequencies.
Figure 22:
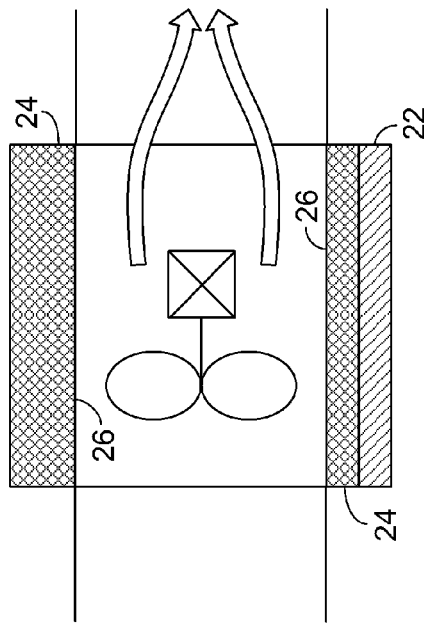
FIG. 22 shows an exemplary air handler with a bottom section using the embodiment of FIG. 19A.
Figure 21:
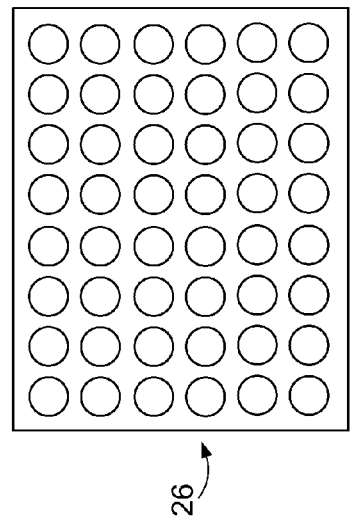
FIG. 21 shows a front view of the open cell structure of FIG. 19B that allows portions of the open cell foam to protrude from openings defined in the perforated rigid facing.

FIG. 17 shows airflow between the two panels 20 which represent acoustically insulted surfaces and sound attenuation layers. FIGS. 17-19A show a first embodiment in which a fiberglass core 22 has an open cell foam 24 layered with at least one side of the fiberglass core 22. FIGS. 17 and 19-22 show a second embodiment combining the use of open cell foam 24 with the use of perforated rigid facing 26. FIG. 22 shows a third embodiment in which the entire insulation board 10 is replaced with an uncoated open cell foam pad 24.

Turning first to the first embodiment shown in FIGS. 17-19A, this layered embodiment includes a fiberglass core 22 (or other type of insulation) that has an open cell foam 24 layered with at least one side of the fiberglass core 22. One advantage to using both the fiberglass material and the open cell foam material is that it is less expensive than using open cell foam material alone because open cell foam more expensive than fiberglass. Another advantage to using both the fiberglass material and the open cell foam material is that it weighs less than using fiberglass material alone because fiberglass weighs more than open cell foam. Another advantage to using both the fiberglass material and the open cell foam material is that is that the two materials provide different types of acoustic insulation over a different range of frequencies. Together, the two materials provide sound absorption over greater range of frequencies. The graph in FIG. 20 (shown with a vertical axis as the absorption coefficient going from 0 to 1 and a horizontal axis showing the frequency going from 0 to 10,000 Htz at approximately the peak point) is meant to be exemplary and does not necessarily reflect accurate measurements.

Figure 19A:
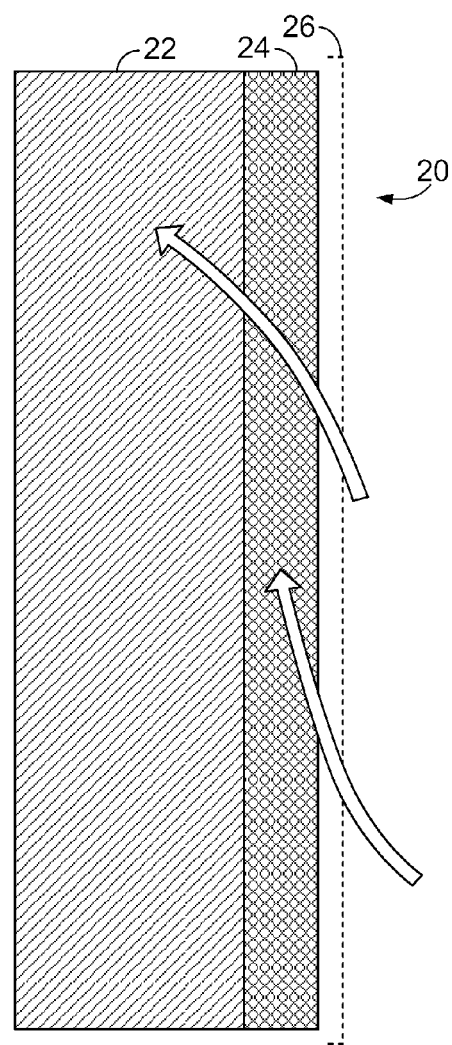
FIG. 19A shows an embodiment in which a fiberglass core has an open cell foam layered on one side of the fiberglass core.
Figure 19B:
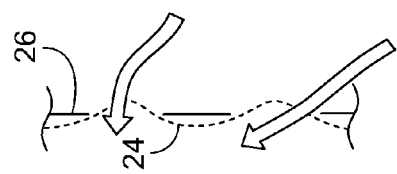
FIG. 19B shows an embodiment in which an open cell structure of the open cell foam allows portions of the open cell foam to protrude from openings defined in the perforated rigid facing.

Alternative embodiments of the first layered embodiment include a fiberglass core 22 with one side layered with open cell foam 24 (FIG. 19A), a fiberglass core 22 with both sides layered with open cell foam 24 (FIG. 18), and a fiberglass core 22 and layered with open cell foam 24 secured by perforated rigid facing 26 (FIG. 19B). The bottom section of FIG. 22 shows the embodiment of FIG. 19A in use in an exemplary air handler. It should also be noted that an alternative embodiment of the present invention could include more than two layers of different types of insulation. For example, a four layer version could be open cell foam, fiberglass, rockwool, and open cell foam. The layered embodiment could actually be "tuned" using different types of insulations, different quantities of insulations, and different thicknesses of insulations to have the desired acoustic properties for the intended use.

The present invention also includes a method for making an air handler using the panels and layers. The method includes the steps of providing an air handler system with at least one air handler surface, providing a core of first insulation material having at least one layering surface, and providing a facing of open cell foam second insulation material. Then, the facing is at least partially layered to the at least one layering surface to form a layered insulation board. Finally, the at least one air handler surface is at least partially covered with the layered insulation board so that the facing is exposed to airflow through the air handler.

Turning next to the second embodiment shown in FIGS. 17 and 19-22, this perf-secured embodiment combines the use of open cell foam 24 with for use of perforated rigid facing 26. Combining the use of open cell foam and perforated rigid facing 16 provides significant advantages for use in air handlers. For example, the use of the perforated rigid facing 26 to secure the open cell foam 24 does not significantly reduce the sound absorption qualities of the open cell foam 24. As shown in FIG. 19B, the open cell structure of the open cell foam 24 allows portions of the open cell foam 24 to protrude from openings defined in the perforated rigid facing 26 (shown in front view in FIG. 21). The exposed open cell foam 24 is able to absorb sound waves. In one embodiment, protruding open cell foam 24 formed between the openings in the perforated rigid facing 26 absorbs sound waves. This can be compared to prior art embodiments in which sound waves are reflected by the substantially rigid diaphragms formed by the smooth facing 14 being divided by the perforated rigid facing 16.

Alternative embodiments of the second perf-secured embodiment include a fiberglass core 22 and layered with open cell foam 24 secured by perforated rigid facing 26 (FIG. 19) and non-layered open cell foam 24 secured by perforated rigid facing 26 (the bottom section of FIG. 22). It should be noted that alternative embodiments may replace perforated rigid facing 26 shown in FIG. 21 with alternative securing structure such as perforated rigid facing 26 with alternatively shaped openings, straps, netting, wire grids, or other securing structure suitable to prevent the open cell foam 24 from being drawn inward.

The present invention also includes a method for making an air handler using the perf-secured embodiment. The method includes the steps of providing an air handler system with at least one air handler surface, providing open cell foam insulation material, and providing securing structure through which said facing may be exposed. Then, the at least one air handler surface is at least partially covered with the open cell foam insulation material. Finally, the open cell foam insulation material is secured to the at least one air handler surface so that the protruding open cell foam insulation material is exposed to sound waves and/or airflow through the air handler.

Figure 23:
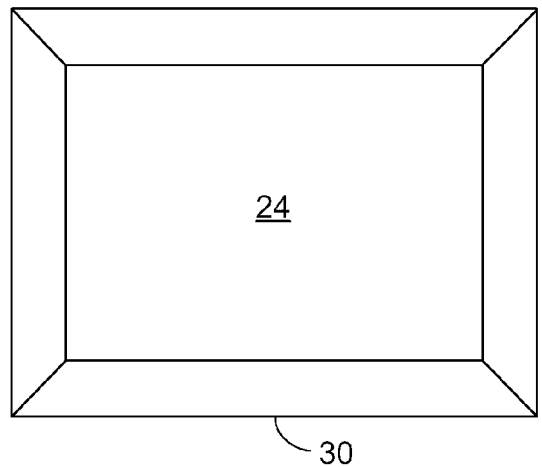
FIG. 23 shows an embodiment in which the entire insulation board is replaced with an uncoated open cell foam pad.
Figure 24:
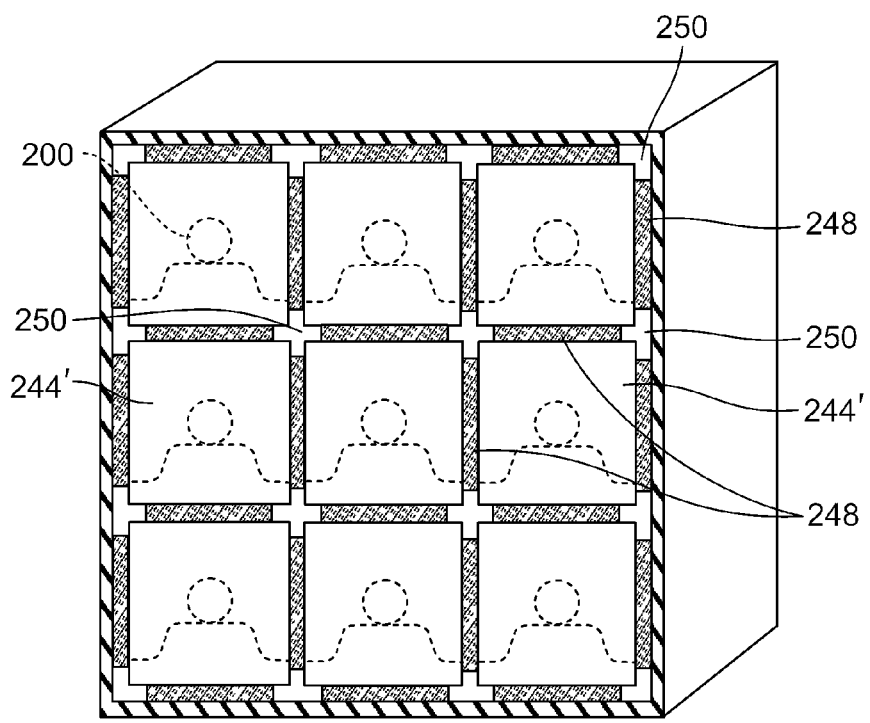
FIG. 24 shows an exemplary insulated grid system or modular unit system with interior surfaces made from acoustically absorptive material that reduces sound wave reaction as the sound waves travel through the insulation surfaces.
Figure 25:
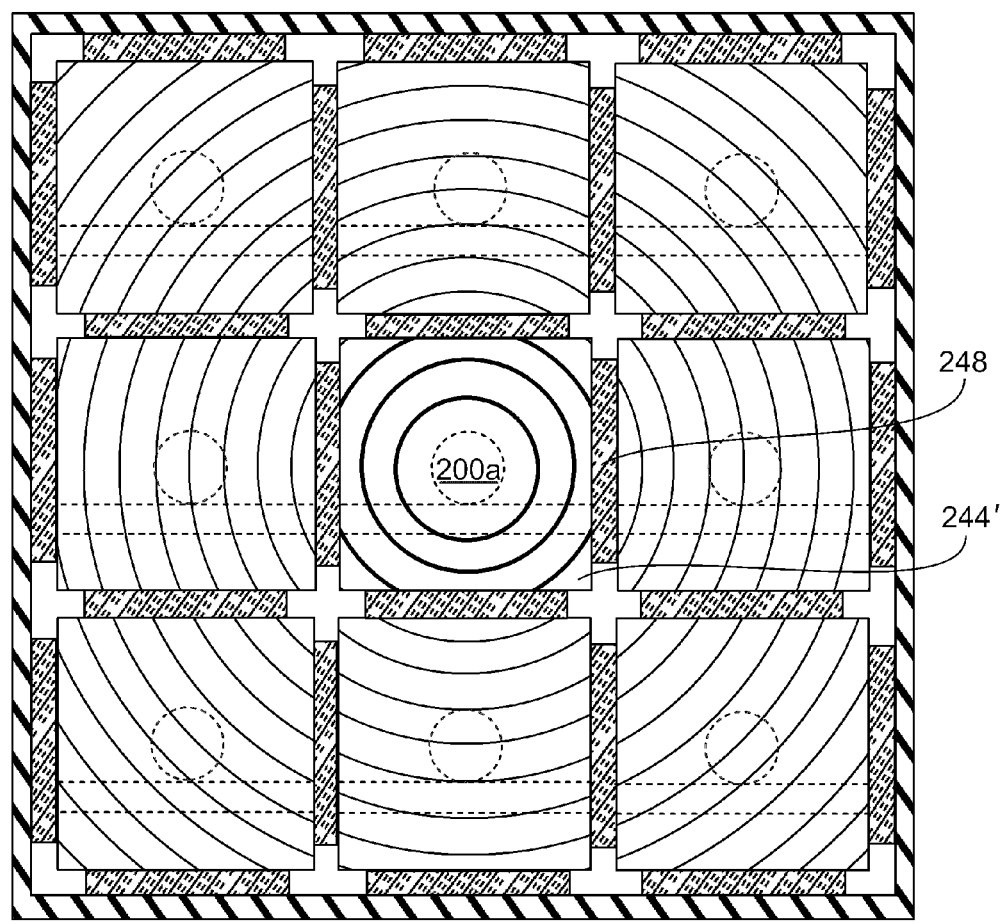
FIG. 25 shows the system of FIG. 24 when the central fan unit is loudest.

Turning next to the third preferred embodiment shown in FIGS. 22 and 23, in this uncoated embodiment combines the entire insulation board 10 is replaced with uncoated open cell foam 24. This would be particularly suitable for uses in which the presence of fiberglass would not be satisfactory for the intended use or would be unacceptable to the intended client. For example, pharmaceutical companies involved in ingestible or injectable drugs would find it unacceptable to have any fiberglass in the air handler. Alternative embodiments of the second uncoated embodiment include uncoated open cell foam 24 secured by perforated rigid facing 26 (FIG. 22) uncoated open cell foam 24 secured in a frame 30 (FIG. 23).

The present invention also includes a method for making an air handler using the uncoated third embodiment. The method includes the steps of providing an air handler system with at least one air handler surface and open cell foam. The method also includes the step of covering at least partially the at least one air handler surface with the open cell foam.

The present invention is directed to the use of open cell foam in air handlers that has the necessary durability, safety, and cleanliness properties for the particular use. One exemplary open cell foam, melamine foam (Melamine-Formaldehyde-Polycondensate), has been shown to be quite suitable for this purpose. Melamine is a lightweight, high temperature resistant, open cell foam that has excellent thermal properties with superior sound absorption capabilities. Melamine is cleanable in that it is relatively impervious to chemicals (e.g. it is able to withstand relatively caustic cleaning agents such as SPOR-KLENZ® without breaking down). Melamine also meets the flame spread, smoke density, and fuel contribution requirements necessary to comply with Class-I building code regulations. Because it does not shed particles, it can be used in places where fiberglass would be precluded. Still further, as melamine is inert, it would not cause the health problems (such as those associated with, fiberglass) for those who are exposed to the product. It also is relatively attractive. It should be noted that melamine foam has been used as acoustic insulation by such companies as illbruk (www.illbruk-sonex-.com). It should be noted that alternative open cell foams could be substituted for melamine. For example, silicone or polyethane foam could be used as the open cell foam of the present invention.

It should be noted that the present invention has been primarily discussed in terms of fiberglass as an alternative type of insulation. It should be noted that other types of insulation may be used in place of fiberglass including, but not limited to rockwool.

Although the embodiments are discussed in terms of layering fiberglass material and the open cell foam material, alternative embodiments could include, bonding the fiberglass material to the open cell foam material, enclosing the fiberglass material within the open cell foam material, coating the fiberglass material with an open cell foam material, and other means for layering the two materials. The term "layers" or "layering" are meant to encompass all of these embodiments as well as others that would be known to those skilled in the art.

It should be noted that the term "air handlers" is meant to include, by way of example, recirculation air handlers, central air handlers, silencer, splitters (such as parallel splitters), clean room ceiling systems, and commercial/industrial air handling systems.

Figure 26:
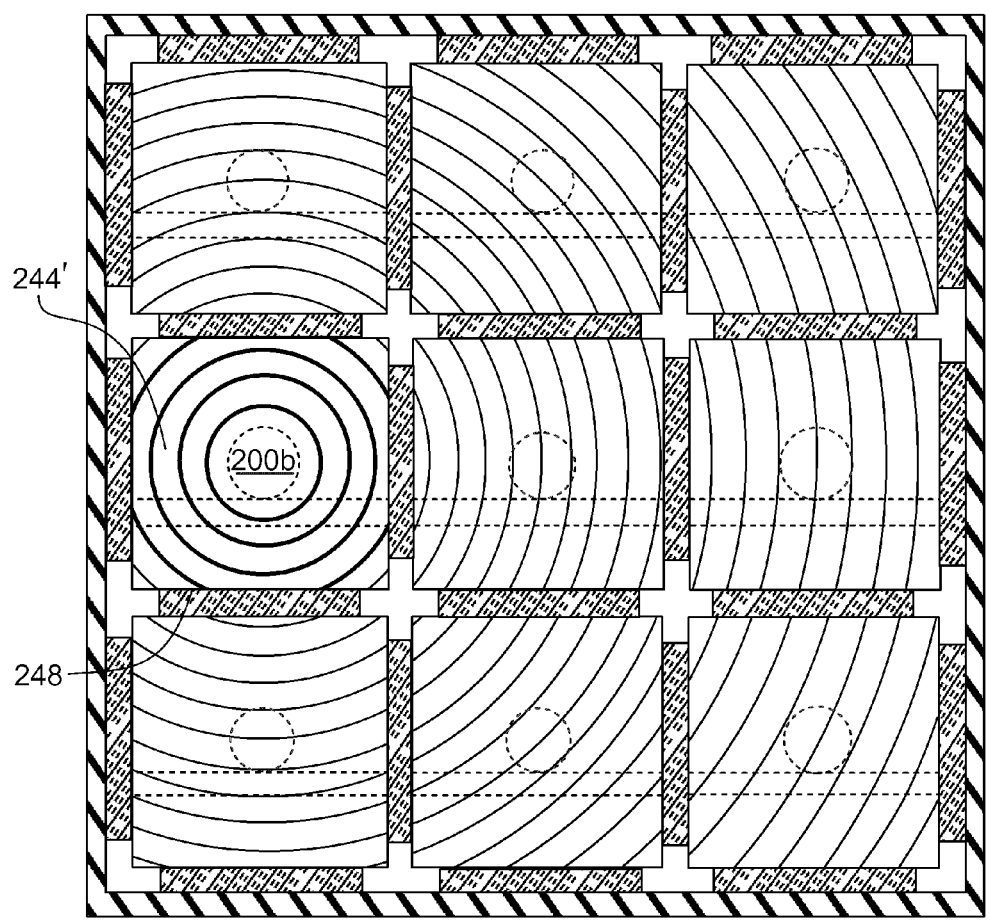
FIG. 26 shows the system of FIG. 24 when the first side fan unit is loudest.
Figure 27:
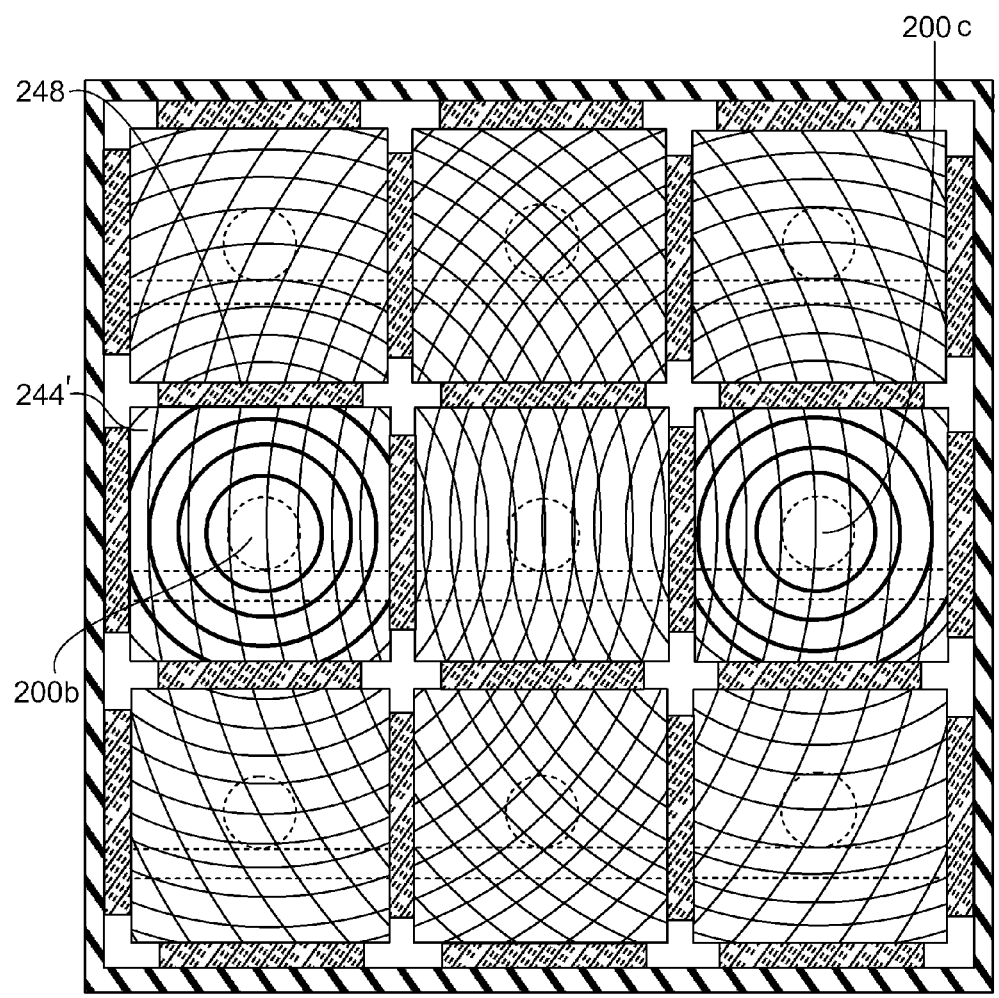
FIG. 27 shows the system of FIG. 24 and a first side fan unit and a second side fan unit with their respective sound waves.
Figure 28:
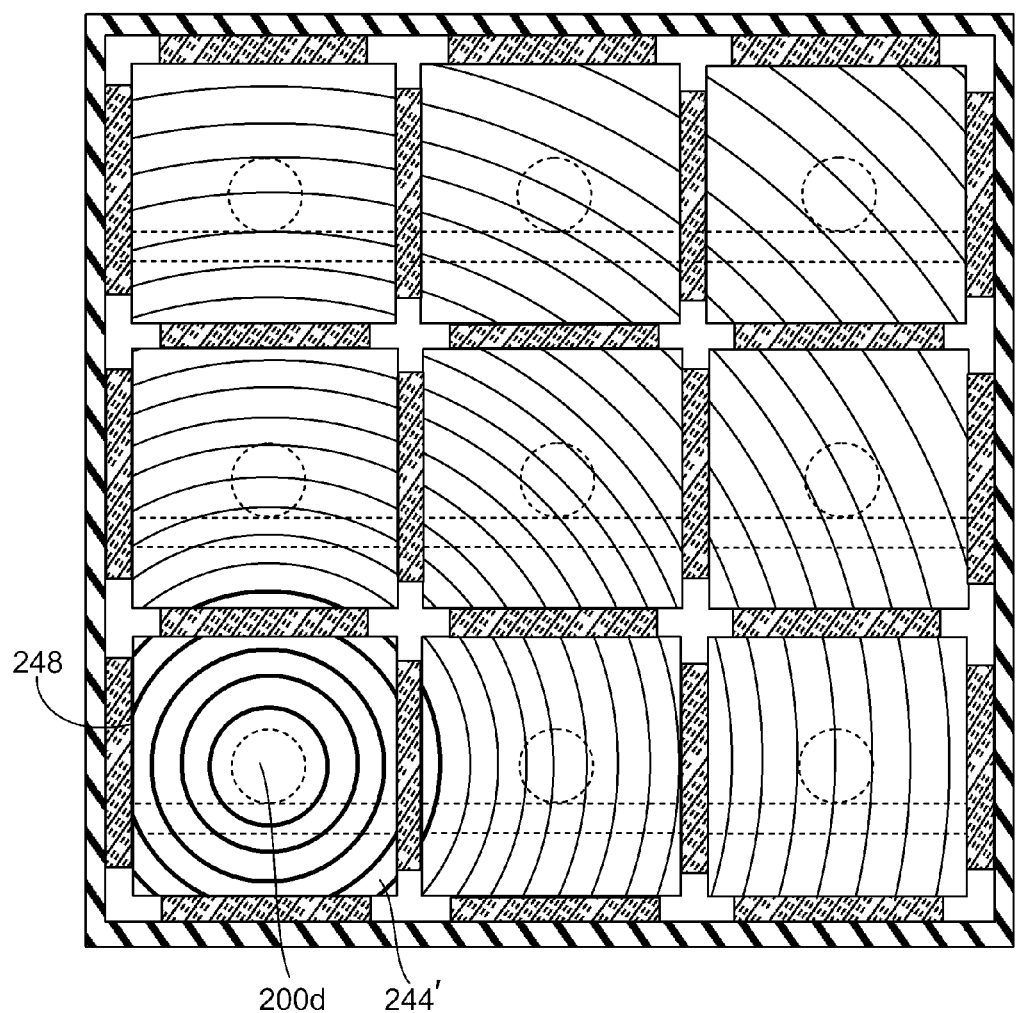
FIG. 28 shows the system of FIG. 24 and emphasizes a first corner fan unit and its wave pattern.
Figure 29:
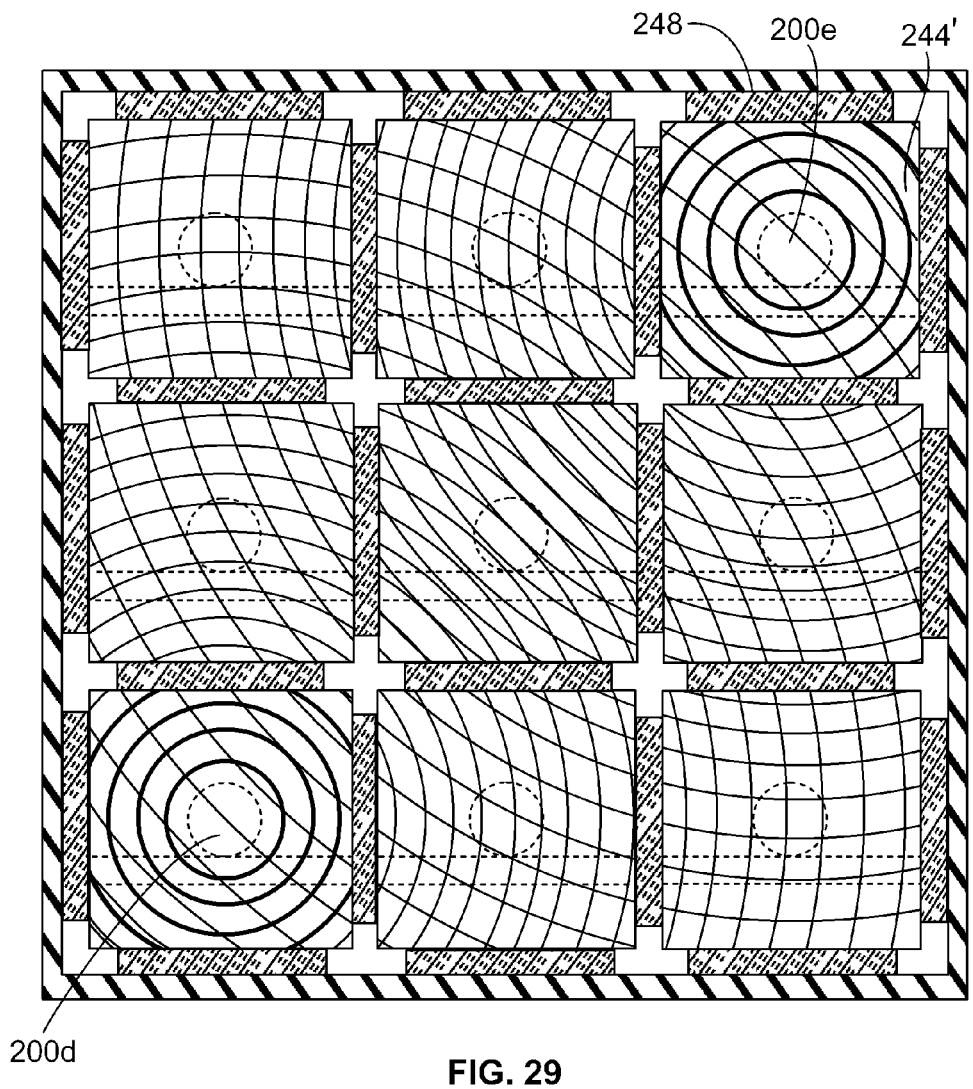
FIG. 29 shows the system of FIG. 24 and emphasizes first and second corner fan units and their respective wave pattern.

FIGS. 24-29 show an exemplary insulated grid system or modular unit system interior surfaces are made from acoustically absorptive material or "insulation surface" 248. In this embodiment, each fan unit cell 244' preferably has a sturdy frame 250 that supports the insulation surfaces 248. In one preferred embodiment the frame would form only the edges of a cube-shaped fan unit cell 244' and the insulation surfaces 248 would form the sides (e.g. top, bottom, and/or sides) of the cube-shaped fan unit cell 244'. In alternative preferred embodiments, the frame may include additional structure or braces for support and/or strength. Together, the insulation surfaces 248 of the fan unit cells 244' tend to function as a coplanar silencer. This is shown graphically in FIGS. 25-29 where the coplanar silencer (formed by the insulation surfaces 248) reduces the sound wave reaction as the sound waves travel through the insulation surfaces 248. For example, in FIG. 25, the central fan unit 200*a* is loudest in its own fan unit cell 244'. As the sound of the fan spreads radially, it at least partially dissipates as it passes through the surrounding insulation surfaces 248. This is shown graphically as the sound wave circles being darkest in the central fan unit cell 244' and lighter in the surrounding fan unit cells 244'. The result is that the sound from the central fan unit 200*a* that eventually emanates from the system is softer than sound that would emanate from a system without the coplanar silencer. In FIG. 26, the first side fan unit 200*b* is loudest in its own fan unit cell 244'. As the sound of the fan spreads radially, it at least partially dissipates as it passes through the surrounding insulation surfaces 248. This is shown graphically as the sound wave circles being darkest in the central fan unit cell 244', lighter in the surrounding fan unit cells 244' and still lighter in fan unit cells 244' more distant from the originating fan unit 200*b*. The result is that the sound from the fan unit 200*b* that eventually emanates from the system is softer than sound, that would emanate from a system, without the coplanar silencer. FIG. 27 shows the first side fan unit 200*b*, a second side fan unit 200*c*, and their respective sound, waves. As shown graphically in FIG. 30, another principle of the present invention is that as the sound waves interact, there is a degree of wave cancellation such that the waves are self-extinguishing. FIG. 30 shows wave A and an opposite wave B that are opposites and therefore interact to form a flat wave A+B. If waves are not exactly opposite, then the combined wave will not be flat, but would have some wave cancellation. This is a basic wave principle of which the present invention is able to avail itself. The result of wave cancellation is that the sound from the fan units 200*b* and 200*c* that eventually emanates from the system is softer than sound that, would emanate from, a system without the coplanar silencer. FIG. 28 emphasizes a first corner fan unit 200*d* and its wave pattern. FIG. 29 emphasizes both the first corner fan unit 200*d* and a second corner fan unit 200*b* and their respective wave patterns. The analysis of FIGS. 28 and 29 would be similar to that of FIGS. 26 and 27 respectively. It should be noted that in the preferred embodiment, more than two fans might be running simultaneously and all the running fans would have wave patterns. The wave patterns of all the running fans would be able to take advantage of both the dissipation (as they pass though surrounding insulation surfaces 248) and wave cancellation of the coplanar silencer.

In FIG. 31 the discharge plenum 210 (FIG. 3) is positioned within the fan unit chambers 244, and in alternative embodiments the fan unit chambers 244 could enclose the inlet plenum 212, or at least partially enclose both the inlet plenum 212 and the discharge plenum 210. Still other alternative embodiments of fan unit chambers 244 may have grid or wire surfaces (that increase the safety of the present invention) or be open (that would reduce costs).

Bypass Feature

Multiple fan units enable the array to operate at a range of flow rates from full flow to partial flow where each fan contributes 1/N air flow (where N equals the number of fans). Most direct drive fan systems operate at speeds other than full synchronous motor speed in order to match the heating or cooling requirements of the structure. Speed control is normally maintained using variable frequency drives. Since variable frequency drives are electronic devices, each drive operating within an air handling structure has a certain probability of failure. In a traditional air handling system, if the VFD fails the air handler will either shut down or be operated at full synchronous speed of the motor in what is known as bypass mode. In traditional systems fan units in the air handler have to be throttled back through some mechanical means in order to limit pressure and flow to meet the building requirements. Mechanical throttling in bypass mode on traditional systems creates excessive noise and reduces fan efficiency. The present invention overcomes this problem by allowing for a change in the fan array output by turning certain fans off to meet the design point. The array can be tailored to meet the flow and pressure requirement without the need for mechanical throttling and subsequent added noise and reduction in efficiency.

Although FIG. 31 shows the discharge plenum 210 positioned within the fan unit chambers 244, alternative embodiments of fan unit chambers 244 could enclose the inlet plenum 212, or at least partially enclose both the inlet plenum 212 and the discharge plenum 210. Still other alternative embodiments of fan unit chambers 244 may have grid or wire surfaces (that increase the safety of the present invention) or be open (that would reduce costs).

FIG. 32 shows an array of dampeners 250 that may be positioned either in front of or behind the fan units 200 to at least partially prevent back drafts. In the shown exemplary embodiment the dampeners 250 include a plurality of plates, each plate positioned on its own pivot. In the shown exemplary embodiment, the plurality of plates slightly overlap each other. The shown embodiment is constructed such that when air is flowing through the fan units 200, the plates are in the open position and when the air stops, gravity pulls the plates into the closed position. Preferably, each of the dampeners 250 operates independently such that if some of the fan units 200 are ON and some of the fan units 200 are OFF, the dampeners 250 can open or close accordingly. Although shown as a simple mechanical embodiment, alternative embodiments could include structure that is controlled electronically and/or remotely from the dampeners 250.

Figure 6:
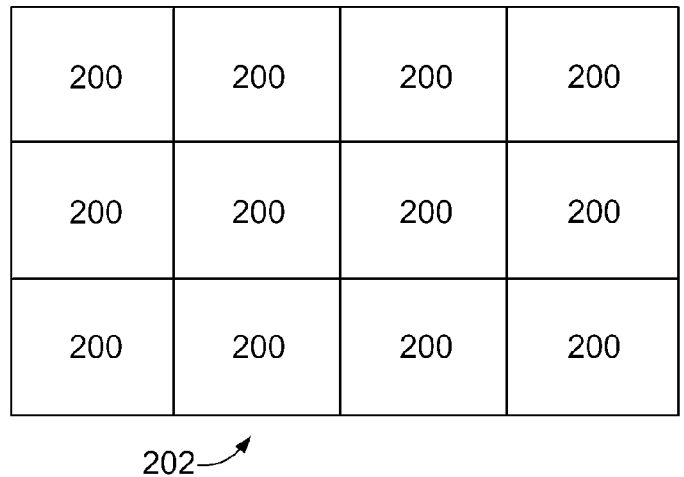
FIG. 6 is a plan or elevation view of a 3×4 exemplary fan array fan section in an air-handling system of the present invention having a plurality of small fan units within an air-handling compartment.
Figure 7:
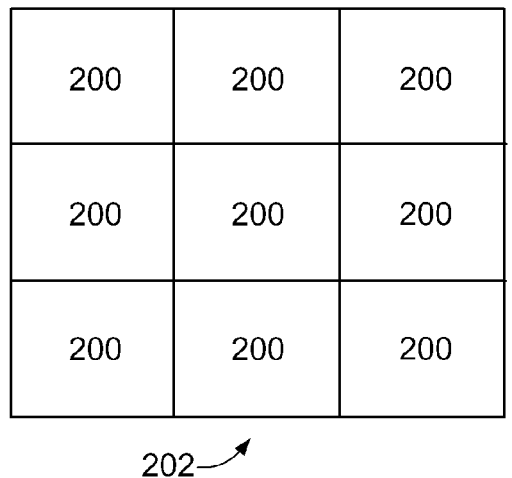
FIG. 7 is a plan or elevation view of a 3×3 exemplary fan array fan section in an air-handling system of the present invention having a plurality of small fan units within an air-handling compartment.
Figure 8:
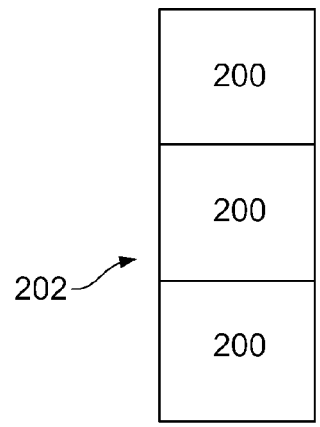
FIG. 8 is a plan or elevation view of a 3×1 exemplary fan array fan section in an air-handling system of the present invention having a plurality of small fan units within an air-handling compartment.
Figures 9, 10:
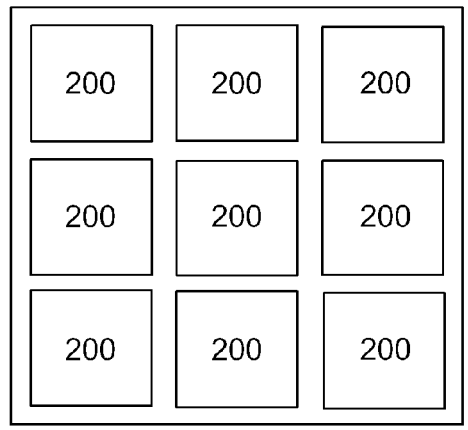
FIG. 9 is a plan or elevation view of an alternative exemplary fan array fan section in an air-handling system of the present invention in which a plurality of small fan units are arranged in a spaced pattern array within an air-handling compartment.
FIG. 10 is a plan or elevation view of an alternative exemplary fan array fan section in an air-handling system of the present invention in which a plurality of small fan units are arranged in a checker board array within an air-handling compartment.
Figure 15:
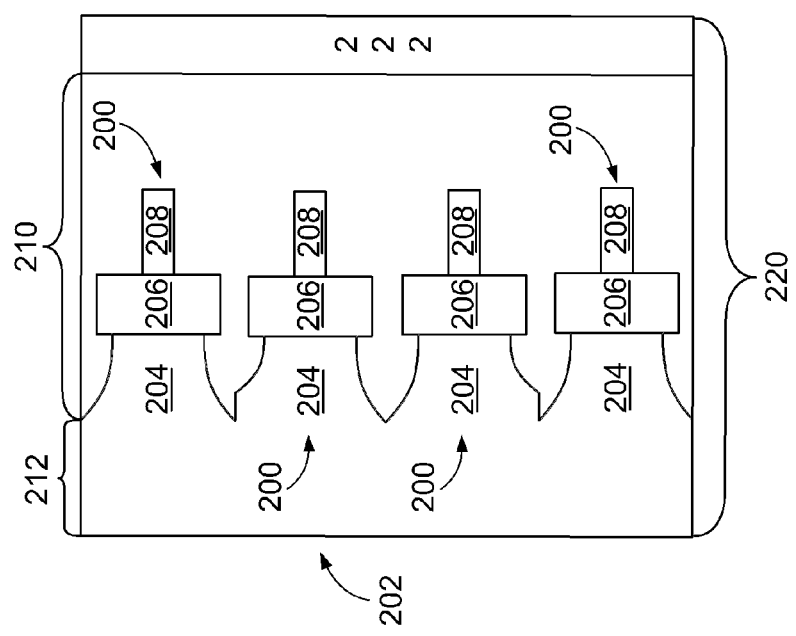
FIG. 15 is a side view of an alternative exemplary fan array fan section in an air-handling system of the present invention having a plurality of staggered small fan units within, an air-handling compartment.

It should be noted that FIG. 4 shows a 4×6 fan array fan section in the air-handling system having twenty-four fan units 200, FIG. 5 shows a 5×5 fan array fan section in the air-handling system having twenty-five fan units 200, FIG. 6 shows a 3×4 fan array fan section in the air-handling system having twelve fan units 200, FIG. 7 shows a 3×3 fan array fan section in the air-handling system having nine fan units 200, and FIG. 8 shows a 3×1 fan array fan section in the air-handling system having three fan units 200. It should be noted that the array may be of any size or dimension of more than two fan units 200. It should be noted that although the fan units 200 may be arranged in a single plane (as shown in FIG. 3), an alternative array configuration could contain a plurality of fan units 200 that are arranged in a staggered configuration (as shown in FIG. 15) in multiple planes. It should be noted that cooling coils (not shown) could be added to the system either upstream or downstream of the fan units 200. It should be noted that, although shown upstream from the fan units 200, the filter bank 122, 222 could be downstream.

It should be noted that an alternative embodiment would use a horizontally arranged fan array. In other words, the embodiments shown in FIGS. 3-15 could be used horizontally or vertically or in any direction perpendicular to the direction of air flow. For example, if a vertical portion of air duct is functioning as the air-handling compartment 202, the fan array may be arranged horizontally. This embodiment would be particularly practical in an air handling compartment for a return air shall.

It should be noted that the fan section 214 may be any portion of the airway path 220 in which the fan units 200 are positioned. For example, the fan units 200 may be situated in the discharge plenum 210 (as shown), the inlet plenum 212, or partially within the inlet plenum 212 and partially within the discharge plenum 210. It should also be noted that the air-handling compartment 202 may be a section of air duct.

Control System

Figure 33:
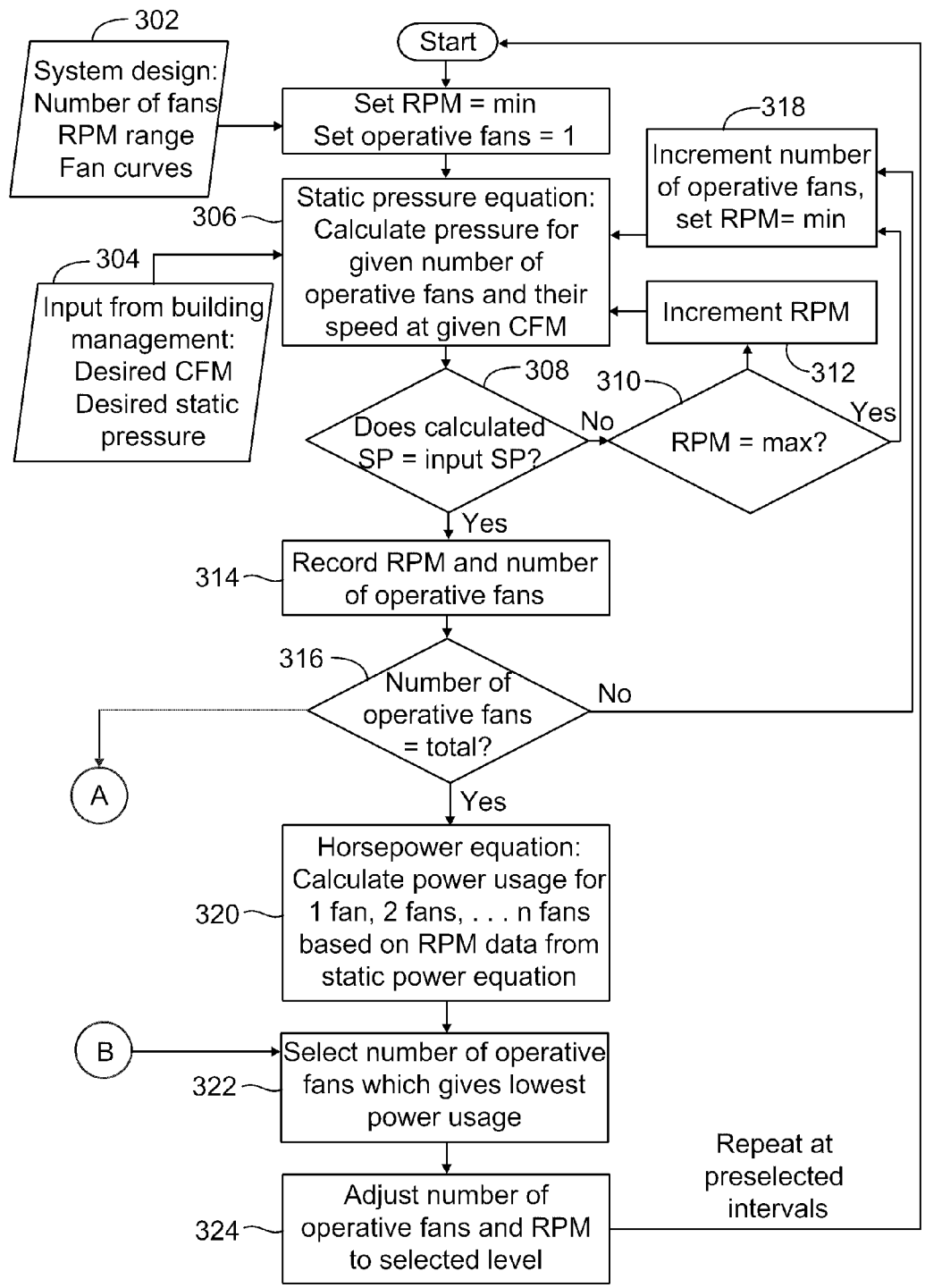
FIG. 33 illustrates an algorithm for operating a fan array in accordance with an embodiment.

Turning now to FIG. 33, an electronic controller 300 may be implemented to automatically select a number of operative fan units and the RPM speed of each fan unit in order to achieve a predetermined or desired level of efficiency for the overall fan array. For example, the desired level of efficiency may be to approximately maximize the efficiencies, to attain a high percentage efficiency (e.g., 90%, 80%, etc.) and the like. In certain applications, fan units may achieve the desired level of efficiency within a narrow RPM range. In an exemplary embodiment, the controller 300 operates in a feedback control loop to maintain the fan units 200 continuously operating in a desired efficiency range. The controller 300 varies the airflow and/or static pressure continuously or periodically by varying the number of fan units 200 operative within the array as environmental parameters for the building change. By way of example, environmental parameters for a building include airflow, humidity, temperature and the like. For example, a target environmental parameter for airflow may be set to one-half of a maximum fan-array airflow capacity during the day and 40% at night. Thus the controller 300 may only turn on half of the fan units 200 within the fan-array during the day and turn on 40% of the fan units at night. In this way, energy consumption may be greatly reduced.

The controller 300 achieves a desired level of efficiency of the fan array through the use of an iterative process as shown in FIG. 33. Building management provides environmental parameters or programmed constraints, at 304, based on the air handling needs at a given time or over repeated time intervals. These environmental parameters or constraints 304 may include factors such as static pressure, total airflow, humidity, temperature and the like for desired time periods (e.g., day, night, week days, weekend, etc.). Initially, the controller 300 sets an initial number of operative fans to a predetermined number (e.g. one) and sets an initial RPM speed to a predetermined level (e.g., a fan minimum or a percentage of the motor maximum rated RPM speed, etc.). At 306, the controller 300 calculates a static pressure based on the current number of operative fans and the current RPM speed for a predetermined CFM. Next, at 308, the controller 300 determines whether the candidate static pressure satisfies (e.g. corresponds to) the programmed constraints (e.g., programmed static pressure environmental parameter) that was input by the building management operator. If not, flow moves to 310, where it is determined whether the current RPM speed has reached a maximum for the motor or fan. If not, flow moves to 312 where the RPM speed is incremented by a predetermined amount and a new candidate static pressure is recalculated at 306.

If at 310, the RPM speed has reached the maximum rated level of the motor or fan, then flow moves to 318 where the number of operative fans is incremented by a predetermined amount. At 318, the RPM speed is reset to the initial RPM speed. Next, a new candidate static pressure is calculated at 306. The controller 300 repeats the calculations at 306-318 until the candidate static pressure corresponds to the static pressure input by the building management operator, which represents the RPM speed at which a number of the fan units 200 should be run in order to satisfy the programmed environmental parameters or constraints. For example, the number of fans may represent a single fan unit 200, two fan units 200, and all numbers of fan units 200 up to the total number of fan units 200 in the system. At 314, the controller 300 records, in memory, the RPM speed and number of operative fan units as a potential or candidate RPM/fan unit combination that would achieve the programmed/input static pressure.

Next at 316, the controller 300 determines whether the candidate number of operative fan units equals the total number of fan units in the fan array. If not, flow returns to 318 where the number of operative fan units is again incremented and the RPM speed is reset to the initial RPM speed. If the candidate number of operative fan units equals the total number of fan units in the fan array, flow moves to 320. As the process iterates through the operation at 314, a table of potential RPM/fan unit combinations is created where each entry in the table includes a combination of a candidate RPM speed and a number of operative fan units for the associated input static pressure. Optionally, the candidate RPM speed and number of operative fan units may be saved as the sole candidate for the corresponding static pressure and the remaining operations 316-324 of FIG. 19 omitted. Once the calculation 306-318 is completed, the controller 300 has created and saved multiple combinations of candidate RPM speeds and candidate number of operative fan units that each achieves the programmed or input static pressure.

Continuing in FIG. 33, at 320, the controller 300 successively analyzes each of the potential RPM/fan unit combinations saved in the table created at 314. For each entry in the table, the controller 300 calculates the horsepower required to run the corresponding number of operative fan units 200 (e.g., for each combination of candidate RPM speeds and candidate number of operative fan units that achieve the programmed static pressure).

For example, if one of the potential RPM/fan unit combinations in the table indicated that 5 fan units were to be operative at 2000 rpms, the controller 300 would calculate the power usage of each of the five fan units for the corresponding 2000 rpm speed. Similarly, if another potential RPM/fan unit combination in the table indicated that 10 fan units should be operative at 1500 rpms, the controller would calculate the power usage of each of the 10 fan units at 1500 rpms. Once the power usage is calculated for each potential RPM/fan unit combination, the controller 300 then identifies at 322 a resultant RPM/fan unit combination that utilizes the desired power usage (e.g., lowest power). From the table of potential RPM/fan, unit combinations, the system may select, at 322, the resultant RPM/fan unit combination that requires the least horsepower. Then at 324, the controller 300 turns fan units 200 on or off until the number of operative fan units 200 corresponds to the resultant RPM/fan unit combination. At 324, the controller 300 adjusts the speed of the fan units 200 that are operative to correspond to the RPM speed indicated in the resultant RPM/fan unit combination. In this way, the system will continuously select an efficient combination of the number of operative fan units 200 and fan unit RPM speed to satisfy the programmed constraints 304 provided by the building management operator.

The fan array may be run by a single Variable Frequency Drive (VFD) device. Optionally, a second VFD may be available for redundancy purposes. The speed at which the fan units 200 run may be the same for all fans which corresponds to the result and RPM speed. Optionally, sets or groups of the fan units 200 may be coupled to different VFD devices, such that the RPM speed of each set or group of fan units 200 may be independently controlled. For example, separate VFDs may be coupled to each row, or each column, of fan units 200. The fan units in each row or column may then be set to a common RPM speeds (e.g., $1^{st}$ and last rows set to operate at 2000 rpms, while middle rows are set to operate at 3000 rpms). Optionally, the each fan unit 200 may be coupled to (or integrated with) a corresponding unique VFD device, such that the RPM speed of each fan unit 200 may be independently controlled.

As a further option, multiple VFDs may be made generally available without a direct relation to any particular motor. The VFDs may be configured to be dynamically coupled to one or more corresponding fan units 200 at run time. In this example, the number of VFDs may be used that correspond to the number of different RPM speeds that are, to be utilized simultaneously. For example, one of the multiple VFD may be coupled to a first set of fan units 200 that are set at an RPM speed of 2000 rpm, while a second of the multiple VFD may be coupled to a second set of fan units 200 that are set at an RPM speed of 3000 rpm.

The calculations at 306 may be made based upon fan curves 302 provided by the manufacturer at the time of installation. Fan curves 302 are calculated by taking an individual fan unit 200 and measuring its static pressure output and horsepower input as a function of total airflow. This measurement may occur inside of the air-handling system installed in the building, because the results will vary based on, for instance, the size, shape, and configuration of the plenum in which the fan units 200 are placed. The resulting data may then be fitted with a polynomial curve—the fan curve 302—preferably of fifth or sixth order, with the independent variable being the airflow. The coefficients for each power of the independent variable corresponding to the best-fit curve are found and recorded. Commercially available data analysis software is suitable for this task. When the fitting process is complete, an equation is obtained that will accurately give the static pressure of a single fan unit 200 at a particular airflow. The total static pressure of the system is then given by a summation equation as follows:

$$\sum_{n=0}^{X} C_n CFM^n \left(\frac{Df}{Ef}\right)^n \left(\frac{Ds}{Es}\right)^{n-2},$$

where Cn is the nth power coefficient from the static pressure polynomial curve fit described above, CFM is the airflow in cubic feet per minute, Df is the total number of fan units 200 in the system, Ef is number of operative fan units 200, Ds is the design maximum speed of the fan units 200, Es is the actual operating speed of the fans, and X is a the order of the polynomial used for the static pressure curve fit. Given a static pressure and a required airflow, the controller 300 may iteratively determine at 306-318 the RPM speed of the fan units 200 for each number of operative fan units 200 by inserting different values of RPMs, at 312, into the static pressure equation calculated at 306 until the desired static pressure is reached at 308. This process is repeated 318 for a single fan unit 200, two fan units 200, and so on until the total number of fan units 200 in the array has been reached. Each of the RPM values is then recorded 314 for use by the horsepower calculation 320. The use of a computer greatly speeds the process of finding the necessary fan unit speed for each of the various numbers of operative fan units 200.

As described above, a polynomial curve, again preferably of fifth or sixth order, is also fitted to the data showing brake horsepower as a function of airflow for an individual fan unit 200, and the total consumption of the array is then be calculated by summing the consumption of individual fan units 200. The result of the speed calculation given above is used to simplify the horsepower calculation. After calculating the necessary fan unit speed for each number of operative fans, the resultant operative number/RPM pairs is passed to the brake horsepower equation given by $$\sum_{n=0}^{X} C_n CFM^n \left(\frac{Df}{Ef}\right)^{n-1} \left(\frac{Ds}{Es}\right)^{n-3},$$

where Cn is the nth power coefficient of the horsepower polynomial curve fit described above, CFM is the airflow in cubic feet per minute, Df is the total number of fan units 200 in the system, Ef is number of operative fan units 200, Ds is the design maximum speed of the fan units 200, Es is the operating speed of the fans taken from the static pressure equation, and X is a the order of the polynomial used for the horsepower curve fit. The controller 300 may then calculate 320 the power consumption of the one fan case, the two fan case, and so on up to the total number of fan units 200 based upon the RPM information 314 from the static pressure equation 306. It is then a simple matter for the controller 300 to identify 322 a preferred number of fan units 200 and the fan unit speed that will achieve a desired level of power consumption. The controller 300 may then optionally directly adjust 324 the number of operative fan units 200 to achieve the desired level of power consumption, or it may optionally output a suggestion for a human operator to implement manually. In an exemplary embodiment, the controller 300 recalculates the optimal number of operative fan units 200 at an interval of less than one minute. The frequency of recalculation is limited only by the speed of the computer performing the calculation. In this way, changes in the building's needs may be rapidly implemented and high efficiency achieved at all times.

The controller 300 may be implemented in any of a number of ways. For instance, a general purpose computer may be programmed to control the fan array. Alternatively, a programmable logic controller, in an exemplary embodiment, the Siemens S7 controller, may be programmed with the necessary algorithm. Either of these may use variable-frequency drives, controlled by a digital signal, to control fan unit speed, and digitally-controlled relays to switch fan units 200 on and off. In the alternative, the actual control of fan units 200 may be accomplished by manual switches and rheostats manipulated by human operators. The controller 300 may include a stand alone computer, laptop computer, a programmable microcontroller or processor which performs the various operations discussed herein. The controller 300 may include a microprocessor, or equivalent control circuitry and may further include RAM or ROM memory, logic and timing circuitry, state machine circuitry, and I/O circuitry. The details of the design and operation of the controller 300 are not critical to the present invention. Rather, any suitable controller 300 may be used that carries out the functions described herein.

Figure 34:
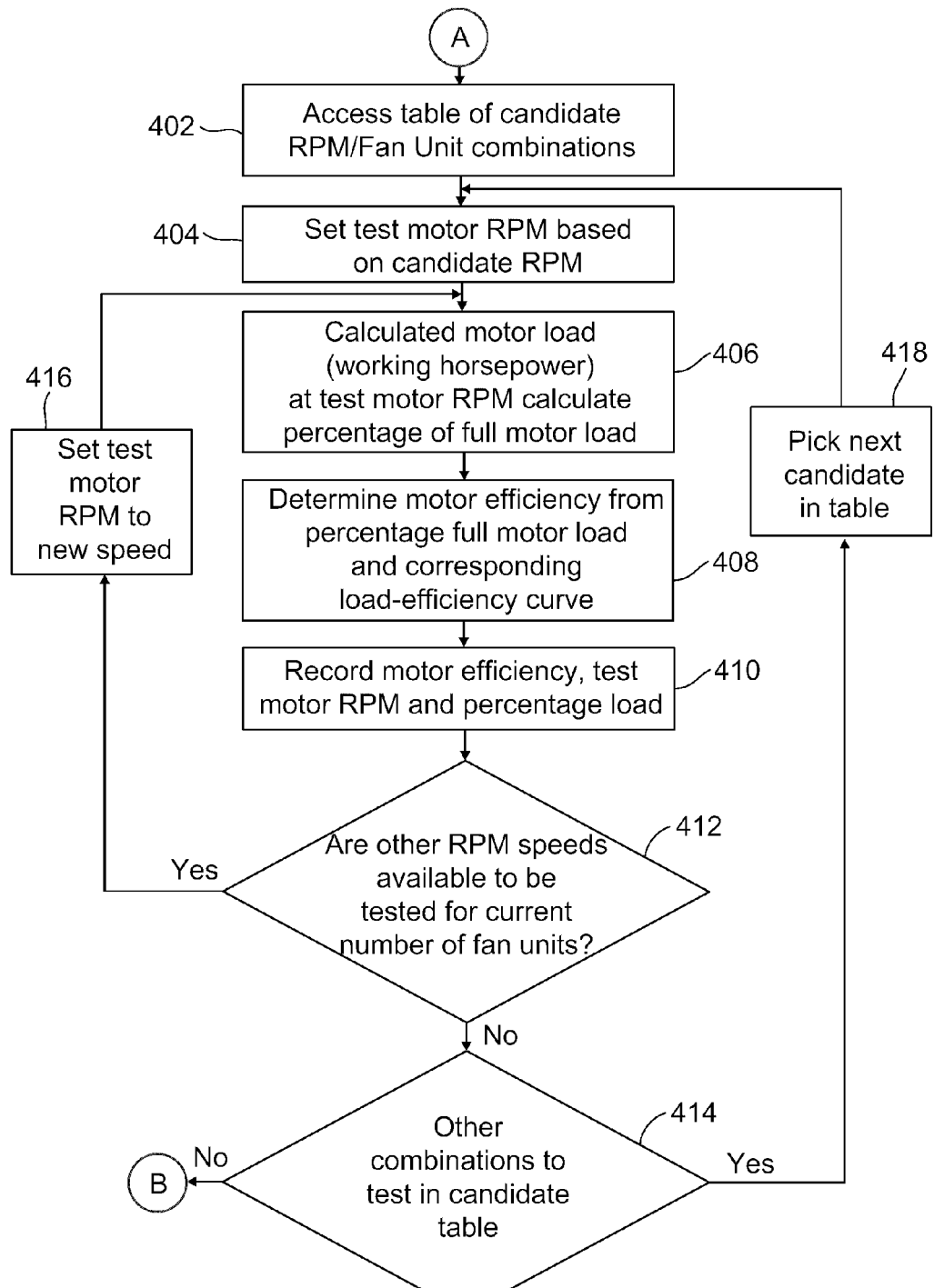
FIG. 34 illustrates an algorithm for operating a fan array in accordance with an embodiment.

FIG. 34 illustrates a process for calculating motor load-efficiency that may be carried out in connection with an alternative embodiment. For example, the process of FIG. 34 may be inserted into the process of FIG. 33 in place of the horsepower calculation operation at 320. The electric motors coupled to the fan units are generally configured to operate at 40% to 100% of the rated load (e.g., the rated horsepower). For example, a motor with a rated load of 10 horsepower (hp) may be configured to operate between 4 and 10 hp. Each motor exhibits a varying amount of efficiency depending, in part, on where the motor operates relative to the motor rated load. For example, a motor may exhibit peak efficiency when operated at or near 70% or 85% of the motor rated load. As a further example, a motor having a 10 hp rated load may have an acceptable load range of 4 to 10 hp, with a peak efficiency at 7.5 to 8.5 hp. Motor efficiency may decrease as the motor's operating load moves below 40% of the rated load or moves near 100% of the rated load. The efficiency curve for motors varies between individual motors and based on motor size and rated load.

The process of FIG. 34 analyzes values for various motor control parameters to determine which values will result in the motor operating with a desired level of motor efficiency. At 402, the table of candidate RPM/fan unit combinations (that was created at 314 in FIG. 33) is accessed and the first candidate combination is analyzed. At 404, a test motor RPM speed is set to correspond to the candidate RPM speed in the first candidate combination from the table. At 406, the controller 300 calculates the current motor load (e.g., in working horsepower) that would be experienced for an individual fan unit when operated at the test motor RPM speed. The current motor load is then compared to the motor's full load (e.g., maximum horsepower) to obtain a percentage full motor load that would be drawn by the motor when operating at the test motor candidate RPM speed. For example, if the test motor candidate RPM speed were 3000 rpm, the controller 300 may determine that this motor will operate at 7 horsepower. If the motor has a full or maximum load of 10 hp, then 7 hp would be a 70% of the full motor load.

Next, at 408 the controller 300 determines the motor efficiency from the percentage full motor load calculated at 406. The motor efficiency may be determined through algorithmic analysis, or from efficiency tables, or from a motor load-efficiency curve, or a combination thereof and the like. For example, if a motor is operating at 70% of full motor load, a load-efficiency curve may indicate that this motor has an efficiency of 90% when at 70% full motor load. Once the motor efficiency has been determined, then at 410 the controller 300 records the motor efficiency, the corresponding RPM speed, the percentage load and the number of operative fan units in a table as a motor-refined candidate RPM/fan unit combination. The foregoing information may be recorded in the same table or a different table as utilized at 314 to record the candidate RPM/fan unit combinations.

Next at 412, the controller 412 determines whether the test motor RPM speed is the last or only available RPM speed for the current number of fan units. If not, flow moves to 416 where the RPM speed is set to a new RPM speed. For example, the RPM speed may be increased or decreased by a set amount at 416. Next, the operations at 406 to 410 are repeated and a new motor-refined candidate RPM/fan unit combination is obtained and saved in the table. The operations at 406 to 410 are repeated until the current number of operative fan units has no more available RPM speeds that may be used. For example, the RPM speed may be successively stepped through a range of RPM speeds that start at a set number of RPMs or at a set percentage below the candidate RPM speed. The operation at step 418 may up the RPS speed until reaching an RPM speed that is a set number of RPMs, or a set percentage, above the candidate RPM speed. Once the available RPM speeds are analyzed for the current number of operative fan units, flow moves from 412 to 414.

At 414, the controller determines whether additional candidate RPM/fan unit combinations exist in the table created at 314 (FIG. 33). For example, if the table includes ten candidate RPM/fan unit combinations, and there are five available RPM speeds that are desired to be tested with each combination, then the operations at 406 to 412 are repeated five times (one for each of the 5 available RPM speeds) for each of the ten candidate RPM/fan unit combinations. In the foregoing example, the operations at 406 to 414 would create a table with 50 motor-refined candidate RPM/fan unit combinations. Thereafter, flow returns to 322 in FIG. 33. Returning to FIG. 33, at 322, the controller 300 selects the motor-refined candidate RPM/fan unit combination that exhibited a desired motor efficiency and static pressure.

FIG. 35 illustrates a multi-tier speed array processing sequence carried out in accordance with an alternative embodiment to calculate multiple sets of operative fan units where each set of operative fan units includes a different RPM speed. Beginning at 502, the number of tiers is set. For example, two or three different RPM speeds may be programmed to be used at the same time. For example, interior fan units may be operated at a higher RPM speed, while peripheral fan units may be operated at a lower fan speed, or vice versa. Alternatively, operative fan units in each row or each column may be alternately assigned first and second RPM speeds. Thus, adjacent fan units may have different RPM speeds, while all of the operative fan units assigned the first RPM speed are interleaved with the operative fan units assigned the second RPM speed. For example, a fan array may be divided into four quadrants, with each quadrant assigned a different RPM speed. As a further example, operative fan units in a first quadrant of the fan array may be assigned a common RPM speed, while one or more quadrants of the fan array may be assigned a different RPM speed. Alternatively, opposed quadrants may be assigned a common RPM speed.

Returning to FIG. 35, at 503 the controller 300 calculates the portion of the total static pressure to be contributed by each of the tiers. The tier contributions may be equal or different. The tier contributions may be proportional to the number of fan units in each tier. For example, if a first tier includes 50% of the total fan units, a second tier includes 25%, a third tier includes 15% and a fourth tier includes 10%, then each tier would be assigned a corresponding percentage (50%, 25%, 15%, 10%) of the programmed static pressure.

Next, at 504, the controller calculates the number of operative fan units and the RPM speed for a current tier. For example, in a two tier 25 fan unit array, where the first and second tiers include 75% and 25%, respectively, of the total fan units, then 75% and 25% of the static pressure would be attributed to each tier. Hence, tier one may utilize 10 operative fan units out of 15 total fan units, while tier two may utilize 2 operative fan units out of 5 total fan units.

Next at 506 the RPM speed and number of operative fan units for a current tier may be refined based on motor efficiencies as discussed above in connection with FIG. 34. Optionally, the operation at 506 may be omitted entirely. Next at 508 it is determined whether all of the tiers have been analyzed and assigned RPM speeds and numbers of operative fan units. If not, flow moves to 510 where the current tier is incremented. The operations at 504 and 506 are repeated for the next tier. When at 508 it is determined that no more tiers exist, the process is completed.

FIG. 36 illustrates a fan array reconfiguration process implemented in accordance with an alternative embodiment. At 602, the controller 300 determines a current or initial configuration of operative fan units. For example, the initial configuration of operative fan units may resemble a checker pattern where alternate fan units are ON and alternate fan units are OFF. After 602, alternative steps may be implemented. For example, in accordance with one embodiment, flow may move to 604 where the controller 300 accesses a collection of stored templates or stored preprogrammed patterns of operative fan units. Optionally, at 606, the controller 300 may implement an algorithm to automatically calculate a new pattern for the operative fan units. Next, at 608, the controller 300 may update the current pattern of operative, fan units with a new pattern of operative fan units from the templates or preprogrammed patterns at 604, or calculated at 606.

Different patterns may be preprogrammed or automatically calculated to evenly distribute the life cycle of the fan units. For example, if a first pattern resembles a checker pattern, the second pattern may include the gaps in the first pattern. Thus, if the first pattern of operative fan units includes fan units #1, #3, #5, and #7 in the first row, the second pattern of operative fan units may include the fan units #2, #4, #6 and #8. The controller 300 may periodically (e.g., every month, every quarter, etc) switch from one pattern to a different pattern. For example, it may be desirable to switch patterns to evenly distribute the life cycle between the fan units. Hence, over a multi-year period, all or most of the fan units would experience substantially equal amounts of operation time.

As a further option, the pattern of operative fan units may only be switched for shorter "cycle" periods of time. For example, once each week, each month, each quarter, etc., the fan units that are normally OFF may be "cycled" by turning them ON, while at least a portion of the fan units that were otherwise ON are turned OFF. The fan units that are temporarily cycled ON may remain ON only for a short period of time (e.g., an hour, a day, etc.). Cycling fan units ON for short periods of time may be desirable to avoid damage, to the bearings and other parts of the motor and fan, that may result from remaining stationary for excessively long periods of time (e.g., to avoid flat spots forming on bearings).

Figure 37:
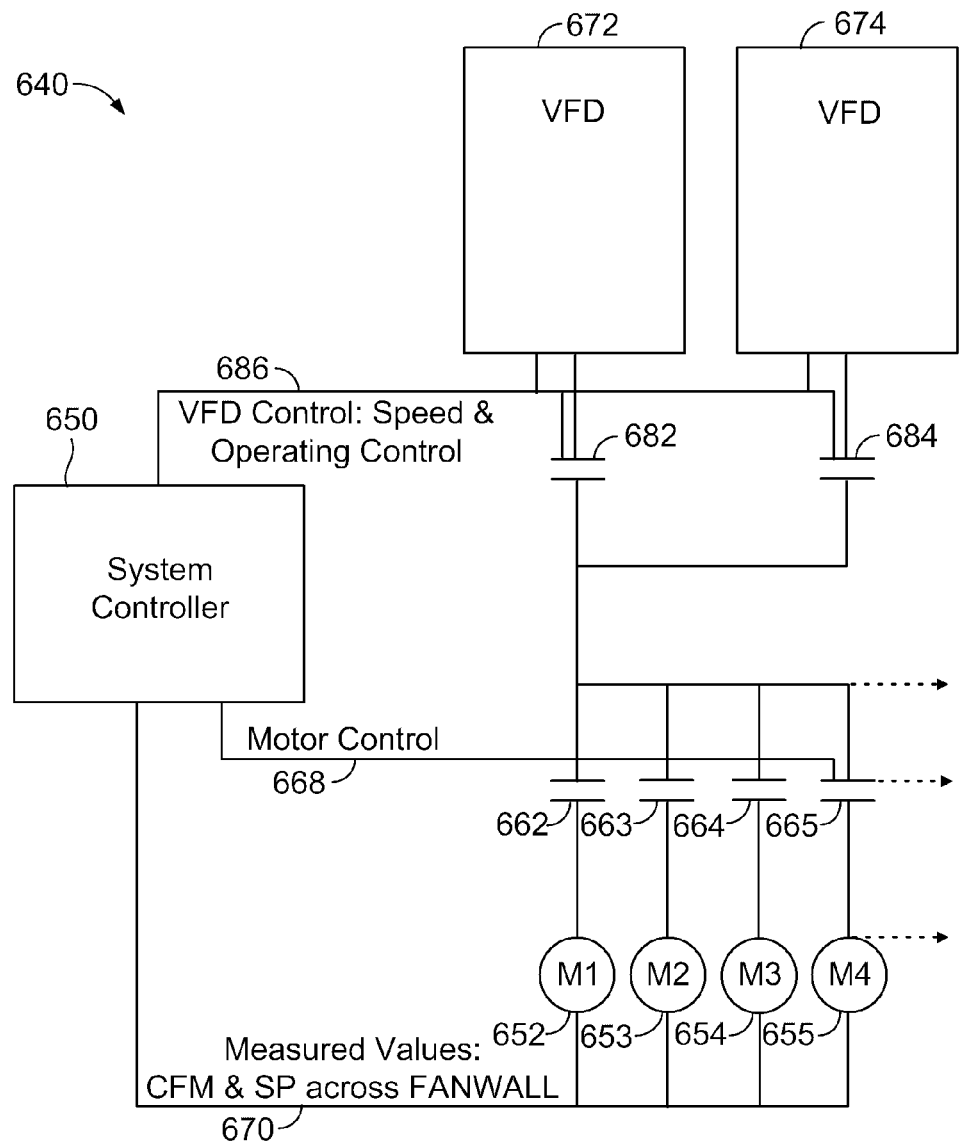
FIG. 37 illustrates a local fan array control system formed in accordance with an embodiment.

FIG. 37 illustrates a local fan array control system 640 that may be implemented in connection with an embodiment of the present invention. The control system 640 is "local" in that it is physically located in relatively close proximity to the fan array. For example, the control system 640 may be integrated into a common framework with the fan array. Alternatively, the control system 640 may be located within the same building or within a common building campus/complex as one or more fan arrays that are controlled by the control system 640. The control system 640 includes a controller 650 that performs the functions discussed above in connection with FIGS. 33-36. The controller 650 may resemble the controller 300. The controller 650 is electrically coupled to an array of motors 652-655 which represent the motors within, and that drive, the fan units 200. It should be realized that more or fewer motors and switches may be utilized as indicated by the dashed line arrows.

The controller 650 is also electrically connected, over a communications/switch line 686, to one or more variable frequency drives (VFD) 672 and 674. The VFD 674 may be a redundant VFD that is only activated when the primary VFD 672 fails or is serviced. The communications/switch line 686 enables the controller 650 to control operation of the VFDs 672, 674. The communications/switch line 686 also controls the state (e.g., open or closed) for switches 682 and 684. By opening or closing the switches 682 and 684, the controller 650 connects one or both of the VFDs 672 and 674 to the motors 652-655. The VFD 672 provides a pulse width modulated (PWM) power signal to the motors 652-655, where the pulse width is changed to control the RPM speed of the motors 652-655.

The controller 650 is connected over a motor switch line 668 to a series of switches 662-665 which correspond in a one to one relation with the motors 652-655. The controller 650 controls the open or closed state of the switches 662-665 to render a select combination of the motors 652-655 operative. The number and combination of motors 652-655 that are rendered operative corresponds to the number of operative fan units calculated above in connection with FIGS. 33-36. The motors 652-655 are connected to a feedback line 670 through which the controller 650 obtains information regarding the motor operational status. Optionally, the feedback line 670 may be connected to sensors that provide measured values such as for the flow rate (in cubic feet per minute), the status pressure, and the like.

Optionally, it may be desirable to use multiple VFDs 672 and 674 at the same time to control different portions of the fan units. By way of example, the first VFD 672 may be connected only to half of the motors 652 and 653, while the second VFD 674 is connected to a remaining half of the motors 654 and 655.

The controller 650 may be implemented as a remote computer, a laptop and the like. The lines 686, 668 and 670 may be serial lines, parallel buses, internet lines and the like. Optionally, the lines 686, 668 and 670 may be replaced with wireless links wherein the controller 650 communicates wireless with one or more of the VFDs 672, 674, switches 682,684, switches 662-665, motors 652-655, and sensors (e.g, over a WiFi link, LAN, WAN, etc.). For example, the system controller 650 may be part of the building management system (BMS) that includes a workstation, operator user interface, display, etc. The BSM may be configured to implement the functionality of the controller that is described above.

Figure 38:
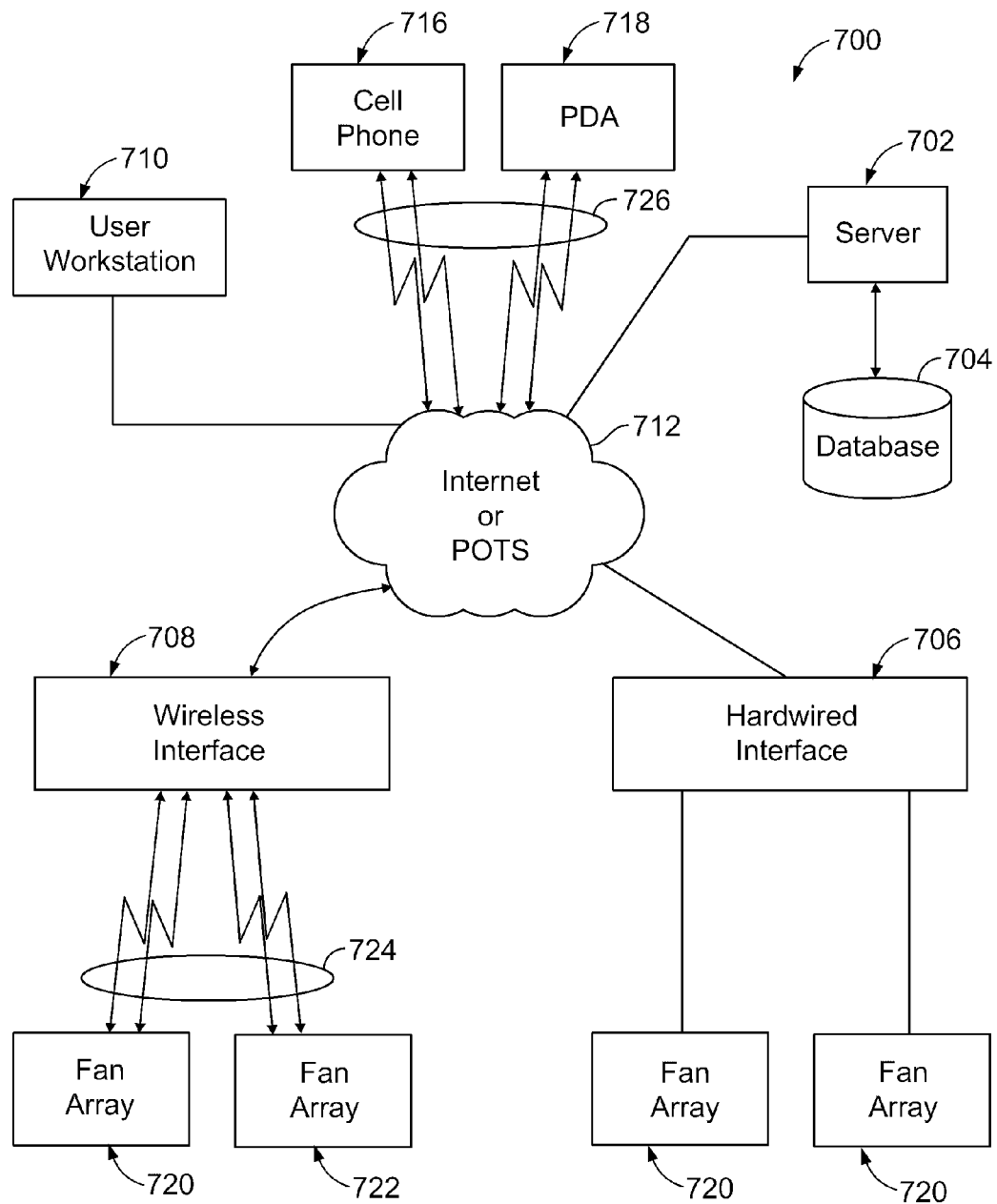
FIG. 38 illustrates a distributed fan array control system formed in accordance with an embodiment.

FIG. 38 illustrates a distributed fan array control system 700 in accordance with one embodiment. The distributed fan array control system 700 includes a server 702 that is connected to a database 704, a hardwired fan array interface 706, a wireless fan array interface 708 and a user workstation 710 electrically connected to a communication system 712. The system 700 may be used to support remote control, configuration and monitoring of fan arrays 720, 722. For example, the work station 710 or server 702 may perform the above discussed calculations as to the RPM speed and number of operative fan units. The resultant RPM/fan unit combination may be passed over the internet, a telephone line or a dedicated local or wide area network to the fan array 720, 722, such as through wireless or hardwired fan array interfaces 708 and 706. Optionally, a fan array may transmit messages through the wireless or hardwired fan array interfaces 708 and 706 to a system operator such as at user workstation 710, PDA 718, cell phone 716, etc. The fan array 720, 722 may transmit notices and feedback to an operator regarding errors that occur a predetermined number of times or for a predetermined amount of time in one day or one week. The server 702 may keep records to determine where to route a service notice. The server 702 may retain the BSM inputs requesting particular environmental parameters or programmed constraints, the tables of candidate and resultant RPM/fan unit combinations, the motor load-efficiency curves, the fan curves, etc. The server may perform the calculations discussed above in connection with FIGS. 33-36.

The communication system 712 may be the internet, a voice over IP (VoIP) gateway, a local plain old telephone service (POTS) such as a public switched telephone network (PSTN), and the like. Alternatively, the communication system 712 may be a local area network (LAN), a campus area network (CAN), a metropolitan area network (MAN), or a wide area network (WAM). The server 702 interfaces with the communication system 712, such as the internet or a local POTS based telephone system, to transfer information between the programmer 706, the wireless fan array interface 708, the user workstation 710 as well as a cell phone 716, and a personal data assistant (PDA) 718 to the database 704 for storage/retrieval of records of information. For instance, the server 702 may download, via a wireless connection 726, to the cell phone 716 or the PDA 718 the results of resultant RPM/fan unit combinations. On the other hand, the server 702 may upload raw fan array data from fan arrays 720 and 722.

Database 704 is any commercially available database that stores information in a record format in electronic memory. The database 704 stores information such as fan curves, past operation time, load-efficiency curves/tables, candidate and resultant RPM/fan unit combinations, motor parameters, and the like. The information is downloaded into the database 704 via the server 702 or, alternatively, the information is uploaded to the server from the database 704.

The interfaces 706 and 708 interface with the fan arrays 720 and 722. The wireless communicate may utilize protocols, such as Bluetooth, GSM, infrared wireless LANs, HIPERLAN, 3G, satellite, as well as circuit and packet data protocols, and the like. The user workstation 710 may interface with the communication system 712 via the internet or POTS to download information via the server 702 from the database 704.

Figure 39:
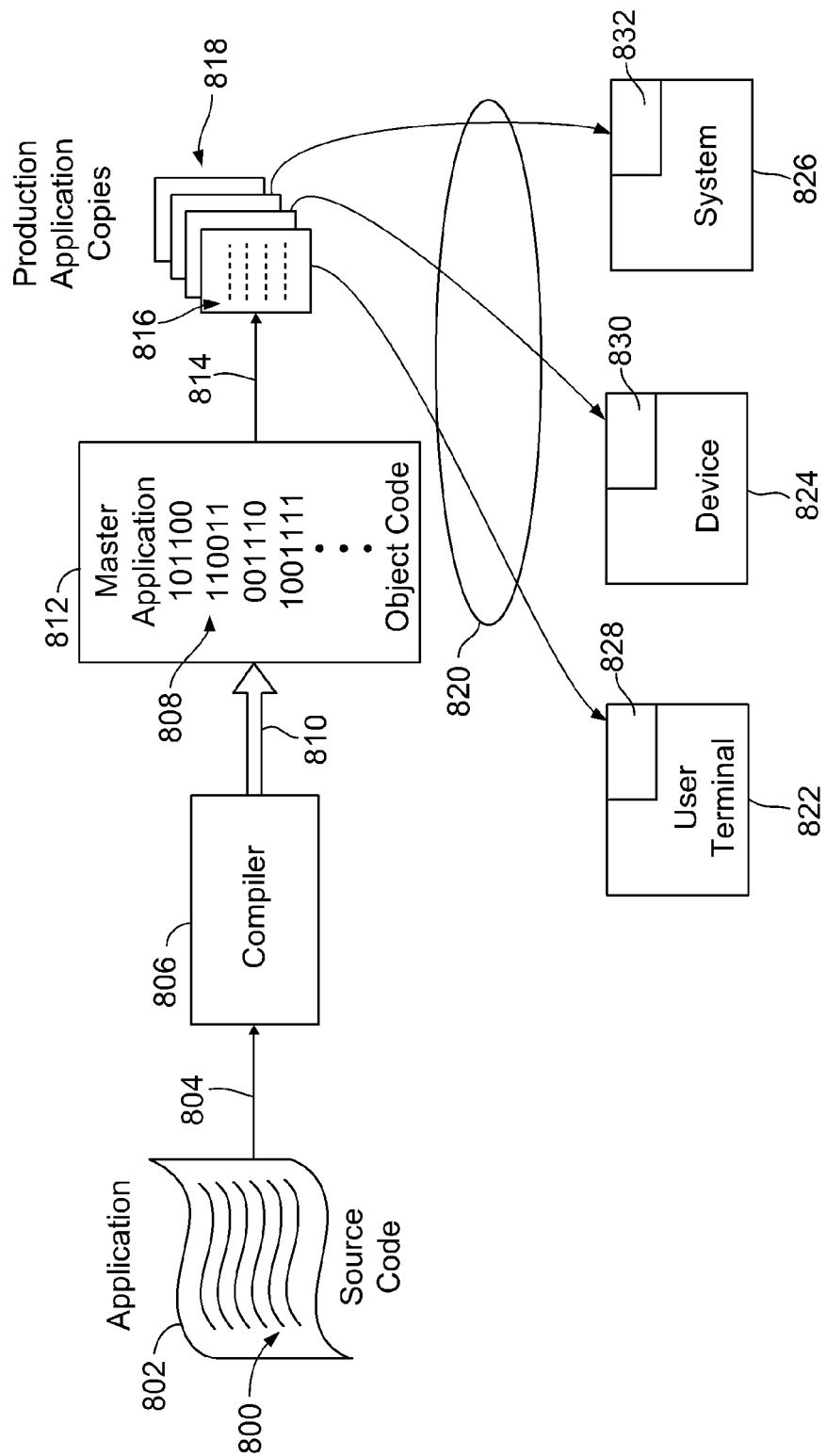
FIG. 39 illustrates a block diagram of a system formed in accordance with an embodiment.

FIG. 39 illustrates a block diagram of example manners in which embodiments of the present invention may be stored, distributed, and installed on a computer-readable medium. In FIG. 39, the "application" represents one or more of the methods and process operations discussed above. The application is initially generated and stored as source code 800 on a source computer-readable medium 802. The source code 800 is then conveyed over path 804 and processed by a compiler 806 to produce object code 808. The object code 808 is conveyed over path 810 and saved as one or more application masters on a master computer-readable medium 812. The object code 808 is then copied numerous times, as denoted by path 814, to produce production application copies 816 that are saved on separate production computer-readable media 818. The production computer-readable media 818 are then conveyed, as denoted by path 820, to various systems, devices, terminals and the like.

A user terminal 822, a device 824 and a system 826 are shown as examples of hardware components, on which the production computer-readable medium 818 are installed as applications. (as denoted by 828 through 832). For example, the production computer-readable medium 818 may be installed on the controller 300. Examples of the source, master, and production computer-readable medium 802, 812, and 818 include, but are not limited to, CDROM, RAM, ROM, Flash memory, RAID drives, memory on a computer system, and the like. Examples of the paths 804, 810, 814, and 820 include, but are not limited to network paths, the internet, Bluetooth, GSM, infrared wireless LANs, HIPERLAN, 3G, satellite, and the like. The paths 804, 810, 814, and 820 may also represent public or private carrier services that transport one or more physical copies of the source, master, or production computer-readable media 802, 812 or 818 between two geographic locations. The paths 804, 810, 814 and 820 may represent threads carried out by one or more processors in parallel. For example, one computer may hold the source code 800, compiler 806 and object code 808. Multiple computers may operate in parallel to produce the production application copies 816. The paths 804, 810, 814, and 820 may be intra-state, inter-state, intra-country, inter-country, intra-continental, inter-continental, and the like.

The operations noted in FIG. 39 may be performed in a widely distributed manner world-wide with only a portion thereof being performed in the United States. For example, the application source code 800 may be written in the United States and saved on a source computer-readable medium 802 in the United States, but transported to another country (corresponding, to path 804) before compiling, copying and installation. Alternatively, the application source code 800 may be written in or outside of the United States, compiled at a compiler 806 located in the United States and saved on a master computer-readable medium 812 in the United States, but the object code 808 transported to another country (corresponding to path 814) before copying and installation. Alternatively, the application source code 800 and object code 808 may be produced in or outside of the United. States, but production application copies 816 produced in or conveyed to the United States (for example, as part of a staging operation) before the production application copies 816 are installed on user terminals 822, devices 824, and/or systems 826 located in or outside the United States as applications 828 through 832.

As used throughout the specification and claims, the phrases "computer-readable medium" and "instructions configured to" shall refer to any one or all of (i) the source computer-readable medium 802 and source code 800, (ii) the master computer-readable medium and object code 808, (iii) the production computer-readable medium 818 and production application copies 816 and/or (iv) the applications 828 through 832 saved in memory in the terminal 822, device 824, and system 826.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

The terms and expressions that have been employed in the foregoing specification are used as terms of description and not of limitation, and are not intended to exclude equivalents of the features shown and described or portions of them. The scope of the invention is defined and limited only by the claims that follow.

What is claimed is:

1. A control system for an air handling system having a preselected number of fan units, said fan units arranged in a fan array, said array capable of operation with a number of operative fan units less than the preselected number of fan units, the control system comprising:
   a controller calculating multiple combinations of candidate fan unit speeds and numbers of operative fan units configured to provide at least one of a common select static pressure or common select airflow;
   wherein, after calculating the multiple combinations, the controller automatically selects one of the combinations of candidate fan unit speeds and number of operative fan units so as to permit the operative fan units to run at a desired level while providing the at least one of a common select static pressure or common select airflow.

2. The air handling system of claim 1 wherein the controller calculates the combinations by calculating a necessary fan unit speed to give a selected static pressure at a selected airflow for candidate numbers of operative fan units.

3. The air handling system of claim 2 wherein a calculated static pressure at the selected airflow is given by the equation $$\sum_{n=0}^{X} C_n CFM^n \left(\frac{Df}{Ef}\right)^n \left(\frac{Ds}{Es}\right)^{n-2},$$

where $C_n$ are coefficients determined by system design, CFM is the selected airflow in cubic feet per minute, Df is the preselected number of fan units in the system, Ef is the number of operative fan units, which is iteratively incremented, Ds is a design maximum speed of the fan units, Es is a speed of the fan units, which is iteratively incremented, and X is the total number of coefficients.

4. The air handling system of claim 3 wherein the values of coefficients $C_n$ are calculated by a method comprising the steps of:
   a. measuring an empirical static pressure as a function of an empirical airflow for a single fan unit;
   b. fitting the resulting data with a polynomial of order m, where m is an integer;
   c. setting the value of $C_n$ equal to the coefficient of the nth-power term of the fitted polynomial for n running from zero to m; and
   d. setting X equal to m.

5. The air handling system of claim 1 wherein the controller calculates the combinations by iteratively incrementing fan unit speed and the number of operative fan units.

6. The air handling system of claim 1 wherein the controller calculates the combinations through an interactive feedback control loop.

7. The air handling system of claim 1 wherein the controller calculates the combinations by calculating a power level required to operate the fan array at a selected static pressure, a selected airflow, and with different numbers of operative fan units, and then adjusting the number of operative fan units and a speed of the fan units to achieve a select power level.

8. The air handling system of claim 7 wherein the controller calculates the power level required using the equation $$\sum_{n=0}^{X} C_n CFM^n \left(\frac{Df}{Ef}\right)^{n-1} \left(\frac{Ds}{Es}\right)^{n-3},$$

where $C_n$ are coefficients determined by system design, CFM is the selected airflow in cubic feet per minute, Df is the preselected number of fan units in the system, Ef is number of operative fan units, which is iteratively incremented, Ds is a design maximum speed of the fan units, Es is a speed of the fan units, which is iteratively incremented, and X is the total number of coefficients.

9. The air handling system of claim 8 wherein the values of coefficients $C_n$ are calculated by a method comprising the steps of:
   a. measuring the power level as a function of airflow for a single fan unit;
   b. fitting the resulting data with a polynomial of order m, where m is an integer;
   c. setting the value of $C_n$ equal to the coefficient of the nth-power term of the fitted polynomial for n running from zero to m; and
   d. setting X equal to m.

10. The air handling system of claim 1, wherein the controller calculates combinations of candidate fan unit speeds and numbers of operative fan units that satisfy programmed environmental parameters.

11. The air handling system of claim 1, wherein the controller selects one of the combinations to permit the operative fan units to operate in a desired efficiency range.

12. The air handling system of claim 1, wherein the controller is configured to adjust a set of parameters of the fan units based on at least one of fan unit power usage and motor load.

13. The air handling system of claim 1, wherein the controller is configured to:
   a. calculate a power usage for a plurality of candidate RPM and fan unit combinations;
   b. select one of the candidate RPM and fan unit combinations based on a corresponding power usage; and
   c. adjust operating parameters of the fan units to correspond to the selected one of the candidate RPM and fan unit combinations.

14. The air handling system of claim 1, wherein the controller is configured vary at least one of air flow volume and static pressure, in a feedback control loop as environmental parameters for a building change.

15. The air handling system of claim 1, wherein the controller achieves a desired level of efficiency of the fan array through an iterative process of calculating the combinations and selecting one of the combinations.

16. The air handling system of claim 1, wherein the controller performs the automatic selection based on programmed environment parameters that include at least one of airflow volume, static pressure, humidity and temperature.

17. The air handling system of claim 1, wherein, for each combination, the controller calculates multiple sets of operative fan units where each set of operative fan units has a different associated fan unit speed, the controller selecting one combination such that first and second sets of operative fan units operate at the same time but with different corresponding first and second fan unit speeds.

18. The air handling system of claim 1, wherein the controller automatically calculates a pattern for the operative fan units.

19. The air handling system of claim 1, wherein the controller selects a pattern from preprogrammed patterns or automatically calculates the pattern.

20. The control system of claim 1, further comprising:
   a. a user input, for the controller, configured to permit a user to program the desired level; and
   b. an output from the controller configured to be coupled to the fan array.

21. The control system of claim 1, further comprising a fan array of a preselected number of fan units.

22. The control system of claim 1, wherein the controller is configured to take the fan units on and off line when a building control system requires a low volume of air at relatively high pressure.

23. The control system of claim 1, wherein the controller is configured to modulate the fan units on and off line to produce a select operating point.

24. The control system of claim 23, wherein the select operating point represents a stable operating point.

25. The control system of claim 1, wherein the controller is configured to modulate the fan units on and off to eliminate surge effects, where the surge effect occurs when a system pressure is too high for the fan speed at a given volume and the fan units have a tendency to go into stall.

26. The control system of claim 1, wherein the controller is configured to take off line a number of the fan units and speed up on-line fan units, to avoid a surge effect, where the surge effect occurs when a system pressure is too high for the fan speed at a given volume and the fan units have a tendency to go into stall.

27. The control system of claim 1, wherein the controller is configured to modulate the fan units on and off line and control the speed of the fan units that are on line to produce a stable operating point and avoid stall.

28. A method for controlling an array of fan units having a preselected number of fan units, said fan units arranged in a fan array, said array capable of operation with a number of operative fan units less than the preselected number of fan units the method comprising:
   providing a controller calculating an operating level required to operate the array at a selected static pressure and a selected airflow for multiple different candidate numbers of operative fan units;
   identifying, from the multiple candidate numbers, one of the candidate numbers of operative fan units that will achieve a desired operating level while providing the selected static pressure and selected airflow; and
   turning fan units on or off until said identified one of the candidate numbers of operative fan units is reached.

29. The method of claim 28 wherein the controller calculates the operating level by calculating a power level required using the equation $$\sum_{n=0}^{X} C_n CFM^n \left(\frac{Df}{Ef}\right)^{n-1} \left(\frac{Ds}{Es}\right)^{n-3},$$

where $C_n$ are coefficients determined by system design, CFM is the airflow in cubic feet per minute, Df is the preselected number of fan units in the system, Ef is number of operative fan units, which is iteratively incremented, Ds is a design maximum speed of the fan units, Es is an operating speed of the fans, which is iteratively incremented and X is the total number of coefficients.

30. The method of claim 29 wherein the values of coefficients $C_n$ are calculated by a method comprising the steps of:
   a. measuring the power level as a function of airflow for a single fan unit;
   b. fitting the resulting data with a polynomial of order m, where m is an integer;
   c. setting the value of $C_n$ equal to the coefficient of the nth-power term of the fitted polynomial for n running from zero to m; and
   d. setting X equal to m.

31. The method of claim 28, wherein the controller calculates the candidate numbers of operative fan units through an iterative feedback control loop.

32. The method of claim 28 further comprising the step of calculating a fan unit speed required to provide a selected volume of airflow at a selected static pressure for different numbers of operative fan units.

33. The method of claim 32 wherein the results of the fan unit speed calculation are used in calculating power level.

34. The method of claim 28 wherein the static pressure is given by the equation $$\sum_{n=0}^{X} C_n CFM^n \left(\frac{Df}{Ef}\right)^n \left(\frac{Ds}{Es}\right)^{n-2},$$

where $C_n$ are coefficients determined by system design, CFM is the airflow in cubic feet per minute, Df is the preselected number of fan units in the system, Ef is the number of operative fan units, which is iteratively incremented, Ds is the design maximum speed of the fan units, Es is an operating speed of the fans, which is iteratively incremented, and X is the total number of coefficients.

35. The method of claim 34 wherein the values of coefficients $C_n$ are calculated by a method comprising the steps of:
   a. measuring an empirical static pressure as a function of an empirical airflow for a single fan unit;
   b. fitting the resulting data with a polynomial of order m, where m is an integer;
   c. setting the value of $C_n$ equal to the coefficient of the nth-power term of the fitted polynomial for n running from zero to m; and
   d. setting X equal to m.

36. The method of claim 28, wherein the controller calculates candidate numbers of operative fan unit units and fan unit speeds that satisfy programmed environmental parameters.

37. The method of claim 28 wherein the controller alters the number of operative fan units automatically.

38. The method of claim 28, further comprising configuring the controller to permit a user to program the desired operating level.

39. The method of claim 28, further comprising providing the array of the preselected number of fan units.

40. The method of claim 28, further comprising configuring the controller to take the fan units on and off line when a building control system requires a low volume of air at relatively high pressure.

41. The method of claim 28, further comprising modulating the fan units on and off line, at the direction of the controller, to produce a select operating point.

42. The method of claim 41, wherein the select operating point represents a stable operating point.

43. The method of claim 28, further comprising configuring the controller to modulate the fan units on and off to eliminate surge effects, where the surge effect occurs when a system pressure is too high for the fan speed at a given volume and the fan units have a tendency to go into stall.

44. The method of claim 28, further comprising configuring the controller to take off line a number of the fan units and speed up on-line fan units, to avoid a surge effect, where the surge effect occurs when a system pressure is too high for the fan speed at a given volume and the fan units have a tendency to go into stall.

45. The method of claim 28, further comprising modulating the fan units on and off line and control the speed of the fan units that are on line to produce a stable operating point and avoid stall.

46. An air handling system comprising:
   a. a preselected number of fan units;
   b. said fan units arranged in a fan array, said array capable of operation with a number of operative fan units less than the preselected number of fan units;
   c. a controller calculating an operating level required to operate the array at a selected static pressure and a selected airflow for each of multiple different candidate numbers of operative fan units, identifying from the multiple candidate numbers one of the candidate numbers of operative fan units that will achieve a desired operating level while providing the selected static pressure and selected airflow, and turning fan units on or off until said identified one of the candidate numbers of operative fan units is reached.

47. The air handling system of claim 46, wherein the controller operates in a feedback control loop to maintain the fan units operating at the desired operating level.

48. The air handling system of claim 46, wherein the controller calculates a necessary fan unit speed to give a selected static pressure at a selected airflow for candidate numbers of operative fan units.

49. The air handling system of claim 46, wherein the controller varies airflow and/or static pressure by varying a number of operative fan units as environmental parameters of a building change.

50. The air handling system of claim 49, wherein the environmental parameters for a building include at least one of airflow, humidity, temperature and static pressure.

51. A method for controlling an array of fan units, comprising the steps of:
   a. providing a preselected number of fan units, said fan units arranged in a fan array, said array capable of operation with a number of operative fan units less than the preselected number of fan units;
   b. automatically calculating, at a controller, multiple combinations of candidate fan unit speeds and numbers of operative fan units configured to provide at least one of a common select static pressure or common select airflow;
   c. automatically selecting, at the controller, from the multiple combinations, one of the combinations of candidate fan unit speeds and number of operative fan units so as to permit the operative fan units to run at a desired level while providing the at least one of a common select static pressure or common select airflow.

52. The method of claim 51, wherein the controller calculates the combinations by calculating a necessary fan unit speed to give a selected static pressure at a selected airflow for candidate numbers of operative fan units.

53. The method of claim 51, wherein the controller calculates the combinations by calculating a power level required to operate the fan array at a selected static pressure, a selected airflow, and with different numbers of operative fan units, and then adjusting the number of operative fan units and a speed of the fan units to achieve a desired power level.

54. The method of claim 51, wherein the controller alters the number of operative fan units automatically.

55. The method of claim 51, wherein the calculating operation is through an iterative feedback loop.

56. The method of claim 51, wherein the calculating operation calculates the combinations through an iterative feedback control loop.

57. The method of claim 51, wherein the calculating operation calculates the combinations of candidate fan unit speeds and numbers of operative fan units that satisfy programmed environmental parameters.

58. The method of claim 51, wherein the selecting operation selects one of the combinations to permit the operative fan units to operate in a desired efficiency range.

* * * * *